United States Patent
Wang et al.

(10) Patent No.: US 10,484,193 B2
(45) Date of Patent: Nov. 19, 2019

(54) EMBMS SESSION SUSPEND/STOP NOTIFICATION

(71) Applicant: QUALCOMM Incorporated, San Diego, CA (US)

(72) Inventors: Jun Wang, San Diego, CA (US); Xipeng Zhu, Beijing (CN); Xiaoxia Zhang, Beijing (CN); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 15/516,376

(22) PCT Filed: Nov. 2, 2015

(86) PCT No.: PCT/CN2015/093569
§ 371 (c)(1),
(2) Date: Mar. 31, 2017

(87) PCT Pub. No.: WO2016/070764
PCT Pub. Date: May 12, 2016

(65) Prior Publication Data
US 2017/0302465 A1 Oct. 19, 2017

(30) Foreign Application Priority Data

Nov. 6, 2014 (WO) ................ PCT/CN2014/090477

(51) Int. Cl.
*H04L 12/18* (2006.01)
*H04W 4/06* (2009.01)
(Continued)

(52) U.S. Cl.
CPC ............. *H04L 12/189* (2013.01); *H04W 4/06* (2013.01); *H04W 72/005* (2013.01);
(Continued)

(58) Field of Classification Search
CPC .... H04L 12/189; H04W 76/20; H04W 76/40; H04W 76/36; H04W 72/005; H04W 4/06; H04W 76/12
See application file for complete search history.

(56) References Cited

U.S. PATENT DOCUMENTS

2009/0196213 A1* 8/2009 Zhong ................... H04W 36/06
370/312
2012/0275399 A1* 11/2012 Liu ...................... H04W 28/065
370/329

(Continued)

FOREIGN PATENT DOCUMENTS

| CN | 102651852 A | 8/2012 |
|---|---|---|
| CN | 102685683 A | 9/2012 |

(Continued)

OTHER PUBLICATIONS

International Search Report and Written Opinion—PCT/CN2014/090477—ISA/EPO—dated Aug. 5, 2015.

(Continued)

*Primary Examiner* — Chirag G Shah
*Assistant Examiner* — Joshua Smith
(74) *Attorney, Agent, or Firm* — Arent Fox, LLP

(57) ABSTRACT

A method, an apparatus, and a computer program product for wireless communication are provided. The apparatus receives a service through an MBMS session. The apparatus receives a first notification of an upcoming suspension of the MBMS session. The apparatus requests establishment of a unicast bearer prior to the upcoming suspension of the MBMS session upon receiving the first notification. The apparatus receives a corresponding unicast version of the service of the MBMS session via unicast when the unicast bearer is established. In an aspect, the first notification may be received during a first MCCH modification period, the corresponding unicast version of the service is received via (Continued)

unicast during a second MCCH modification period. In an aspect, the apparatus may further receive a second notification that the MBMS session is suspended during the second MCCH modification period.

37 Claims, 17 Drawing Sheets

(51) Int. Cl.
  *H04W 72/00* (2009.01)
  *H04W 76/36* (2018.01)
  *H04W 76/40* (2018.01)
  *H04W 76/20* (2018.01)
  *H04W 76/12* (2018.01)

(52) U.S. Cl.
  CPC ........... *H04W 76/20* (2018.02); *H04W 76/36* (2018.02); *H04W 76/40* (2018.02); *H04W 76/12* (2018.02)

(56) References Cited

U.S. PATENT DOCUMENTS

| | | | |
|---|---|---|---|
| 2013/0094428 A1 | 4/2013 | Lee | |
| 2013/0128768 A1* | 5/2013 | Balasubramanian | ......................... H04L 1/0038 370/254 |
| 2013/0294321 A1 | 11/2013 | Wang et al. | |
| 2013/0305303 A1* | 11/2013 | Yamagishi | .............. H04L 12/18 725/109 |
| 2014/0050139 A1* | 2/2014 | Piggin | ................. H04W 72/005 370/312 |
| 2014/0071878 A1* | 3/2014 | Xu | ......................... H04L 12/189 370/312 |
| 2016/0192335 A1* | 6/2016 | Kusashima | ........... H04L 5/0053 370/280 |

FOREIGN PATENT DOCUMENTS

| | | |
|---|---|---|
| CN | 103026642 A | 4/2013 |
| EP | 2903310 A1 | 8/2015 |
| WO | 2013025235 A1 | 2/2013 |
| WO | 2013166423 A2 | 11/2013 |
| WO | 2014032291 A1 | 3/2014 |
| WO | 2014146617 A1 | 9/2014 |

OTHER PUBLICATIONS

International Search Report and Written Opinion—PCT/CN2015/093569—ISA/EPO—dated Feb. 25, 2016.

Ericsson: "MBMS Service Continuity Aspects for Group Communication," R2-140821, 3GPP TSG-RAN WG2 #85, vol. RAN WG2, No. Prague, Czech Republic; Feb. 10, 2014-Feb. 14, 2014, Feb. 9, 2014, XP050792105, 11 pages, Retrieved from the Internet: URL: http://www.3gpp.org/Meetings_3GPP_SYNC/RAN2/Docs/ [retrieved on Feb. 9, 2014].

Huawei, et al., "Enhancement of MBMS Service Continuity," R2-142632, 3GPP TSG RAN WG3 Meeting #86, vol. RAN WG3, No. Seoul, South Korea; May 19, 2014-May 23, 2014, May 18, 2014, XP050793715, 2 pages, Retrieved from the Internet: URL: http://www.3gpp.org.ftp/Meetings_3GPP_SYNC/RAN2/Docs/ [retrieved on May 18, 2014].

Huawei, et al., "Enhancement of MBMS Service Continuity," R2-142610, 3GPP TSG-RAN WG2 Meeting #86, vol. RAN WG2, No. Seoul, South Korea; May 19, 2014-May 23, 2014, May 18, 2014, XP050793069, 3 pages, Retrieved from the Internet: URL: http://www.3gpp.org/ftp/Meetings_3GPP_SYNC/RAN2/Docs/ [retrieved on May 18, 2014].

Supplementary European Search Report—EP15857186—Search Authority—Berlin—dated May 23, 2018.

ZTE: "Comparison Between Solution 1 and Solution 2," R3-142244, 3GPP TSG-RAN WG3 Meeting #85bis, vol. RAN WG3, No. Shanghai, P.R. China; Oct. 6, 2014-Oct. 10, 2014, Sep. 26, 2014, XP050870757, 6 pages, Retrieved from the Internet: URL:http://www.3gpp.org/ftp/tsg_ran/WG3_lu/TSGR3_85bis/Docs/ [retrieved on Sep. 26, 2014].

3GPP TS 36.321; "3rd Generation Partnership Project; Technical Specification Group Radio Access Network; Evolved Universal Terrestrial Radio Access (E-UTRA); Medium Access Control (MAC) Protocol Specification (Release 12)", 3GPP Standard; 3GPP TS 36.321, V12.3.0, Sep. 20, 2014, pp. 1-57, XP050925625.

* cited by examiner

```
MBMS-SessionInfoList-r9 ::=        SEQUENCE (SIZE (0..maxSessionPerPMCH)) OF MBMS-SessionInfo-r9

MBMS-SessionInfo-r9 ::=     SEQUENCE {
    tmgi-r9,
    sessionId-r9            OCTET STRING (SIZE (1))         OPTIONAL,       -- Need OR
    logicalChannelIdentity-r9   INTEGER (0..maxSessionPerPMCH-1),
    [SuspendIndicator       BOOLEAN                         OPTIONAL,]
    ...
}
```

FIG. 10

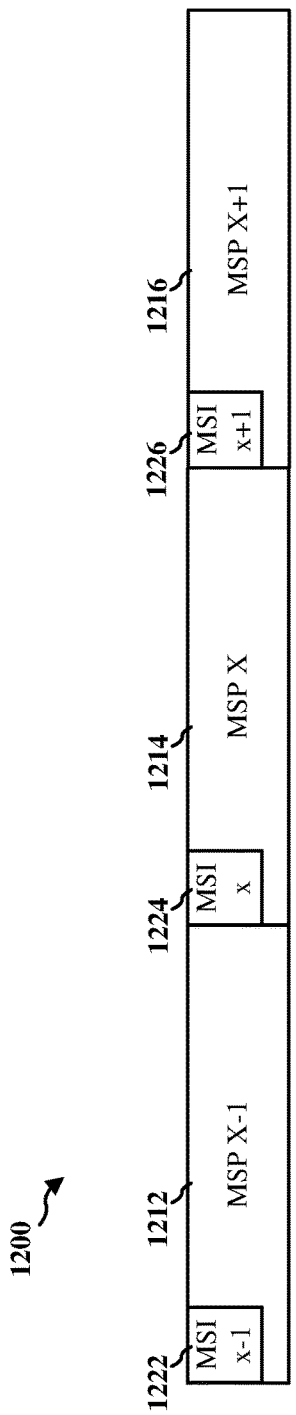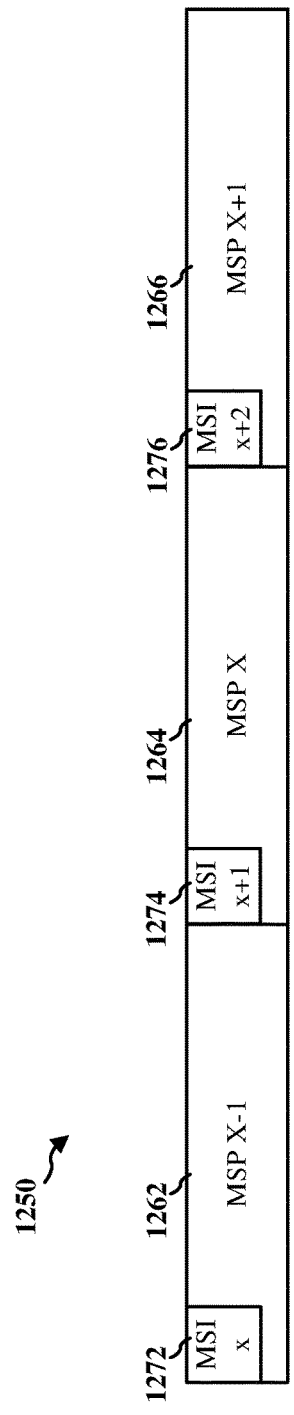

EMBMS SESSION SUSPEND/STOP NOTIFICATION

CROSS-REFERENCE TO RELATED APPLICATION(S)

This application claims priority to Chinese PCT Application Serial No. PCT/CN2014/090477, entitled "EMBMS SESSION SUSPEND/STOP NOTIFICATION" and filed on Nov. 6, 2014, which is expressly incorporated by reference herein in its entirety.

BACKGROUND

Field

The present disclosure relates generally to communication systems, and more particularly, to suspension of a Multimedia Broadcast Multicast Service session.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives a service through a multimedia broadcast multicast service (MBMS) session. The apparatus receives a first notification of an upcoming suspension of the MBMS session. The apparatus requests establishment of a unicast bearer prior to the upcoming suspension of the MBMS session upon receiving the first notification. The apparatus receives a corresponding unicast version of the service of the MBMS session via unicast when the unicast bearer is established.

In another aspect of the disclosure, the apparatus includes means for receiving a service through an MBMS session. The apparatus further includes means for receiving a first notification of an upcoming suspension of the MBMS session. The apparatus further includes means for requesting establishment of a unicast bearer prior to the upcoming suspension of the MBMS session upon receiving the first notification. The apparatus further includes means for receiving a corresponding unicast version of the service of the MBMS session via unicast when the unicast bearer is established.

In another aspect of the disclosure, the apparatus includes a memory and at least one processor coupled to the memory. The at least one processor is configured to: receive a service through an MBMS session, receive a first notification of an upcoming suspension of the MBMS session, request establishment of a unicast bearer prior to the upcoming suspension of the MBMS session upon receiving the first notification, and receive a corresponding unicast version of the service of the MBMS session via unicast when the unicast bearer is established.

In another aspect of the disclosure, a computer-readable medium storing computer executable code for wireless communication includes code for: receiving a service through an MBMS session, receiving a first notification of an upcoming suspension of the MBMS session, requesting establishment of a unicast bearer prior to the upcoming suspension of the MBMS session upon receiving the first notification, and receiving a corresponding unicast version of the service of the MBMS session via unicast when the unicast bearer is established.

BRIEF DESCRIPTION OF THE DRAWINGS

FIG. 10 is a portion of an example MBSFN area configuration message that illustrates an implementation of an MBSFN area configuration message, according to the first approach of the disclosure.

FIG. 12A is an example timeline illustrating the multicast channel scheduling periods (MSPs) and MSIs according to a general implementation.

FIG. 12B is an example timeline illustrating the MSPs and MSIs according to a third aspect of the second approach of the disclosure.

DETAILED DESCRIPTION

Figure 1:
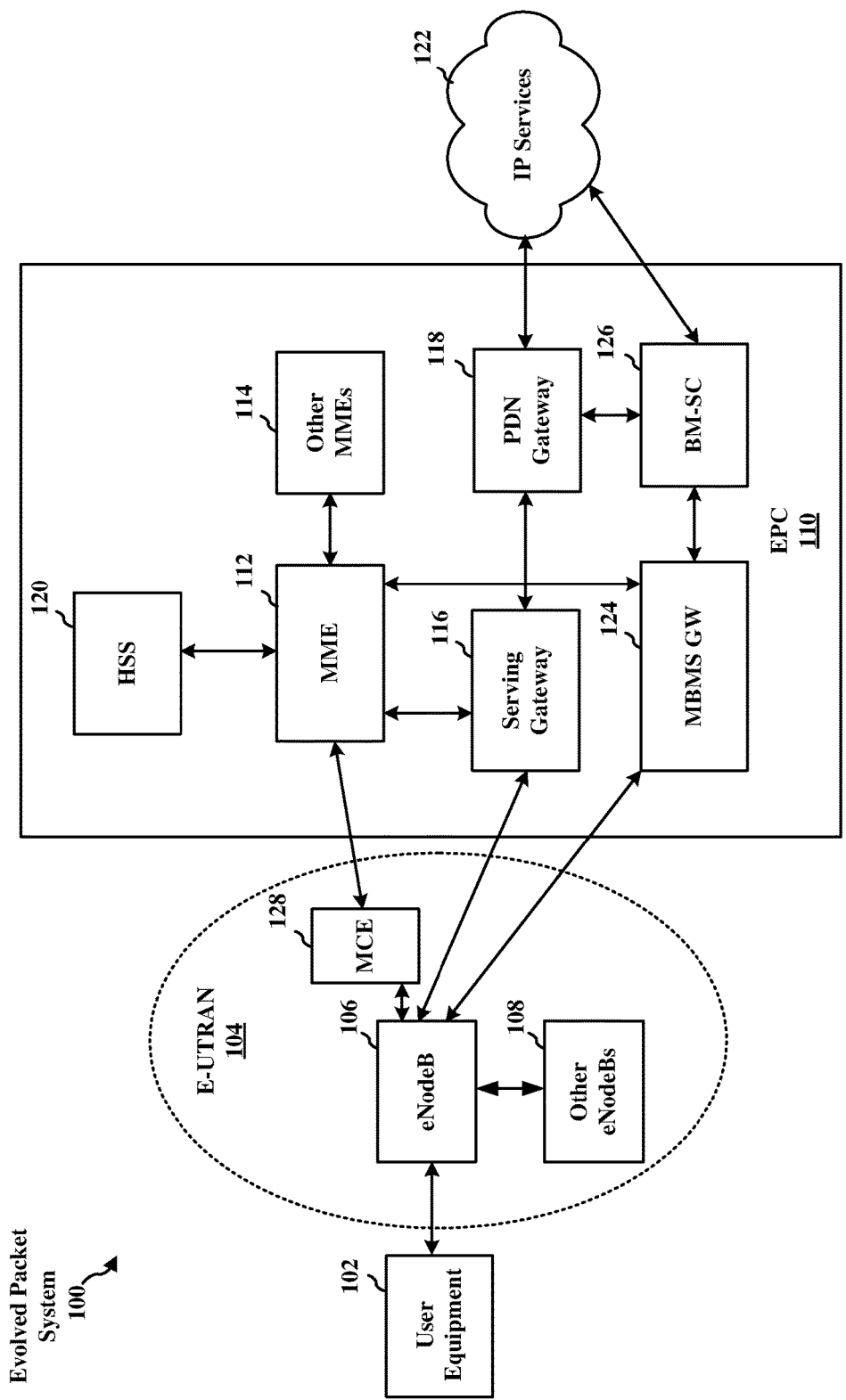
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
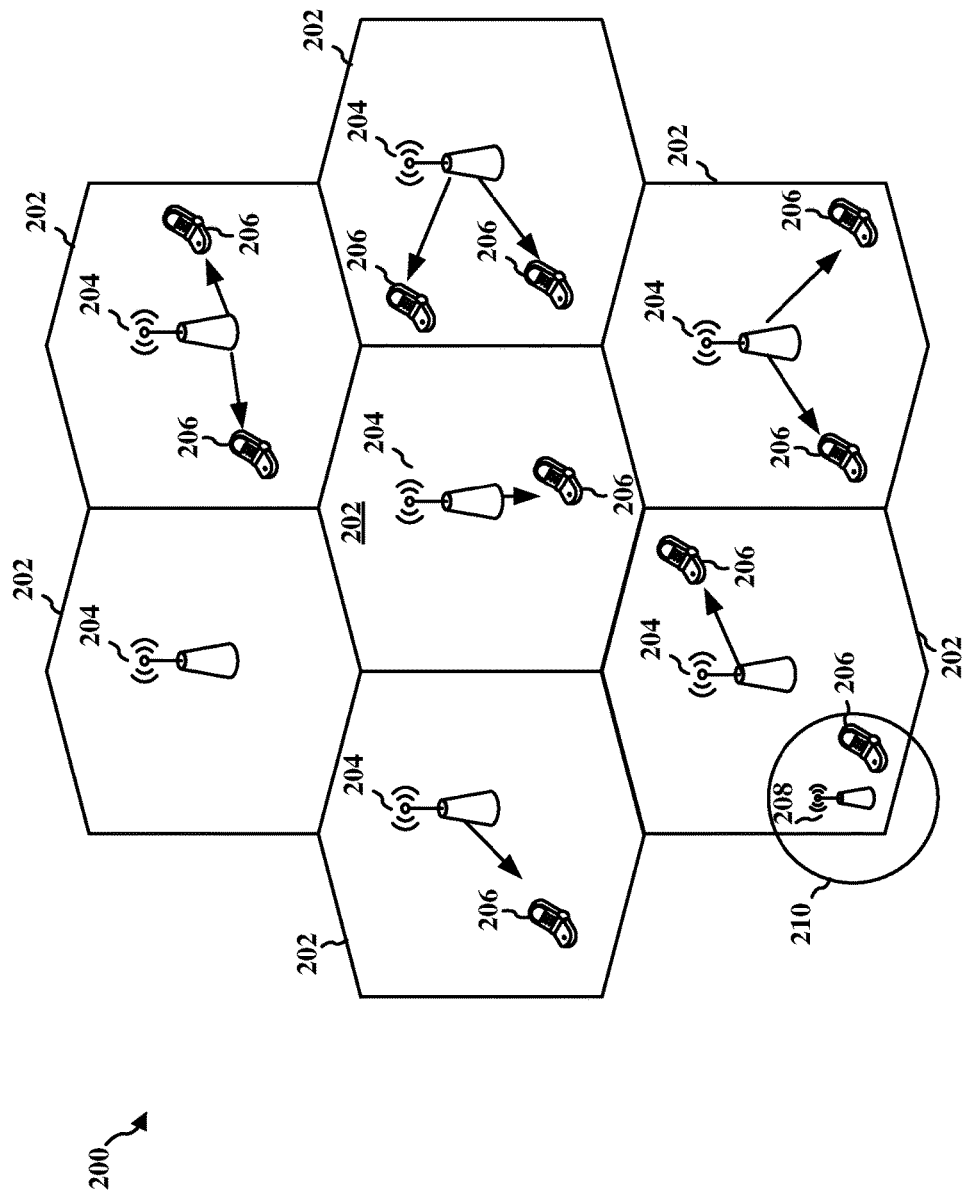
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE. 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
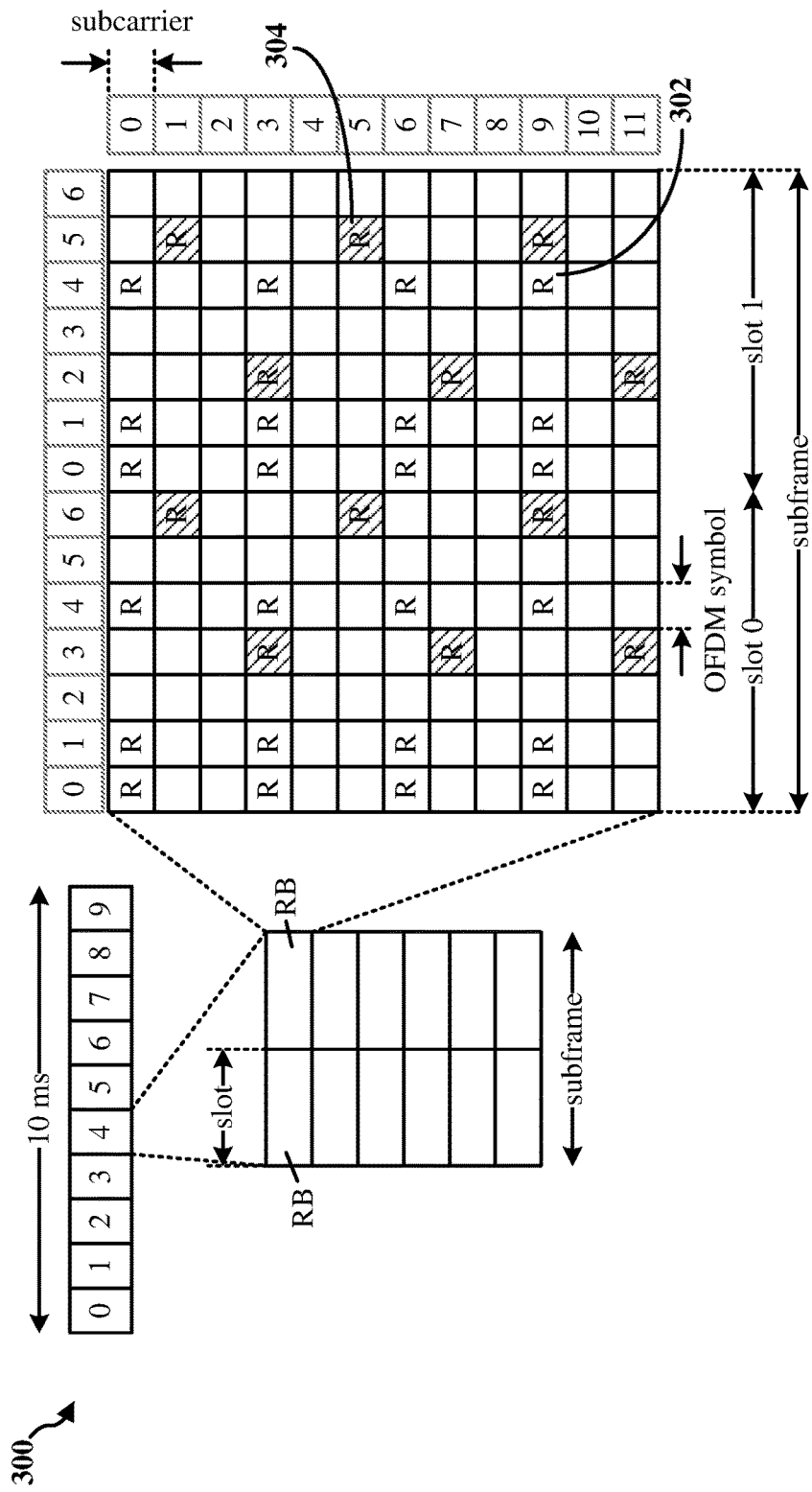
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
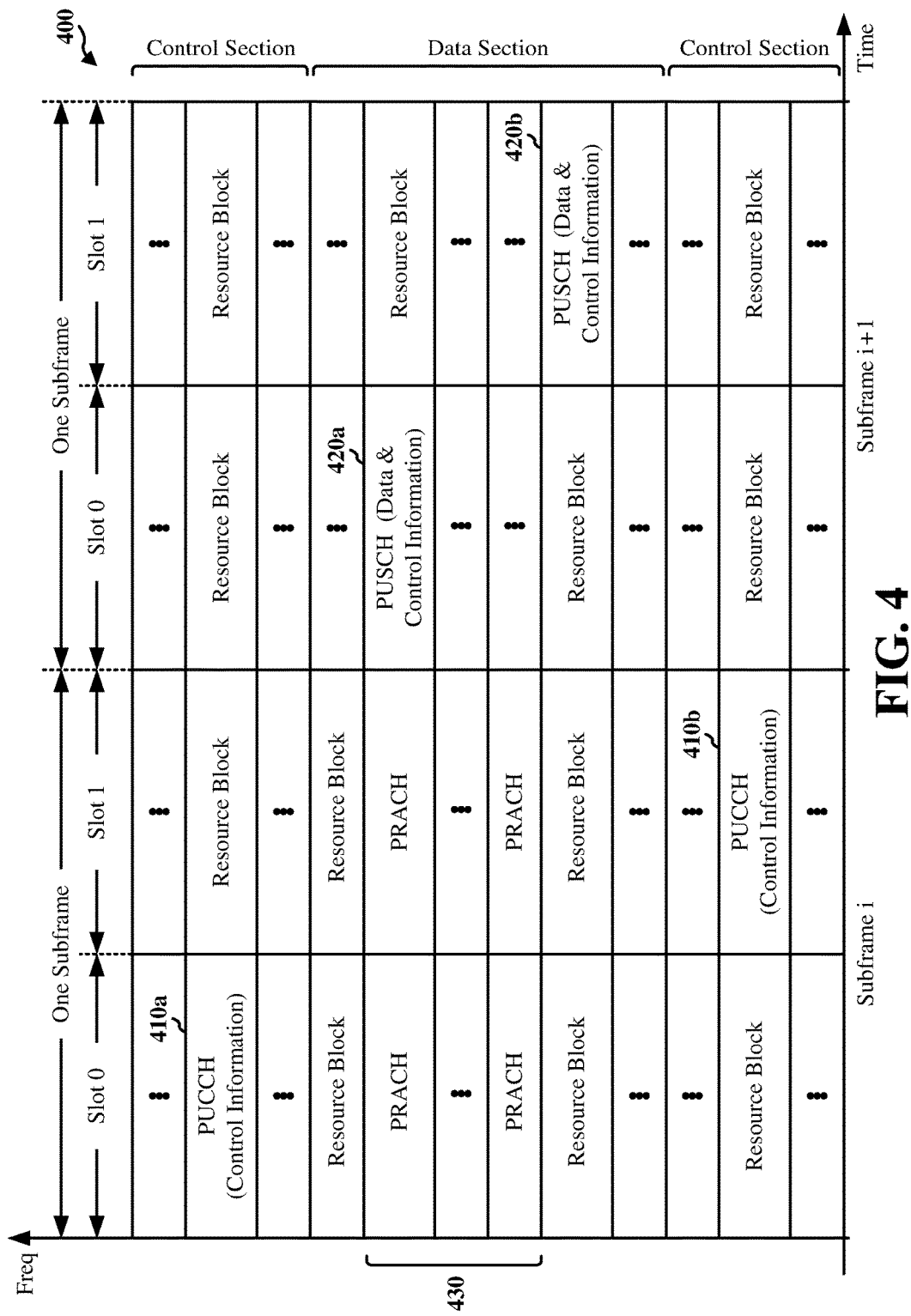
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
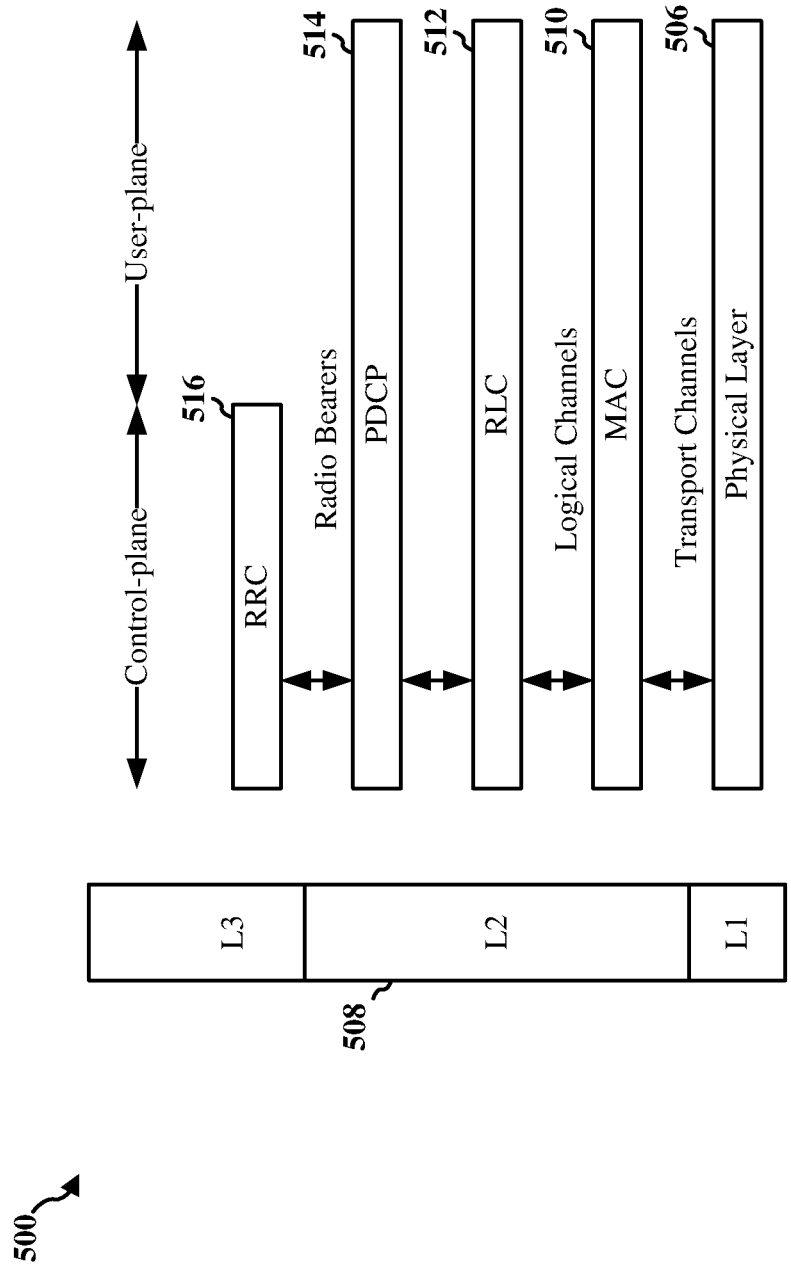
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1(L1layer) is the lowest layer and implements various physical layer signal processing functions. The L1 layer will be referred to herein as the physical layer 506. Layer 2(L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3(L3 layer). The RRC sublayer 516 is responsible for obtaining radio resources (e.g., radio bearers) and for configuring the lower layers using RRC signaling between the eNB and the UE.

Figure 6:
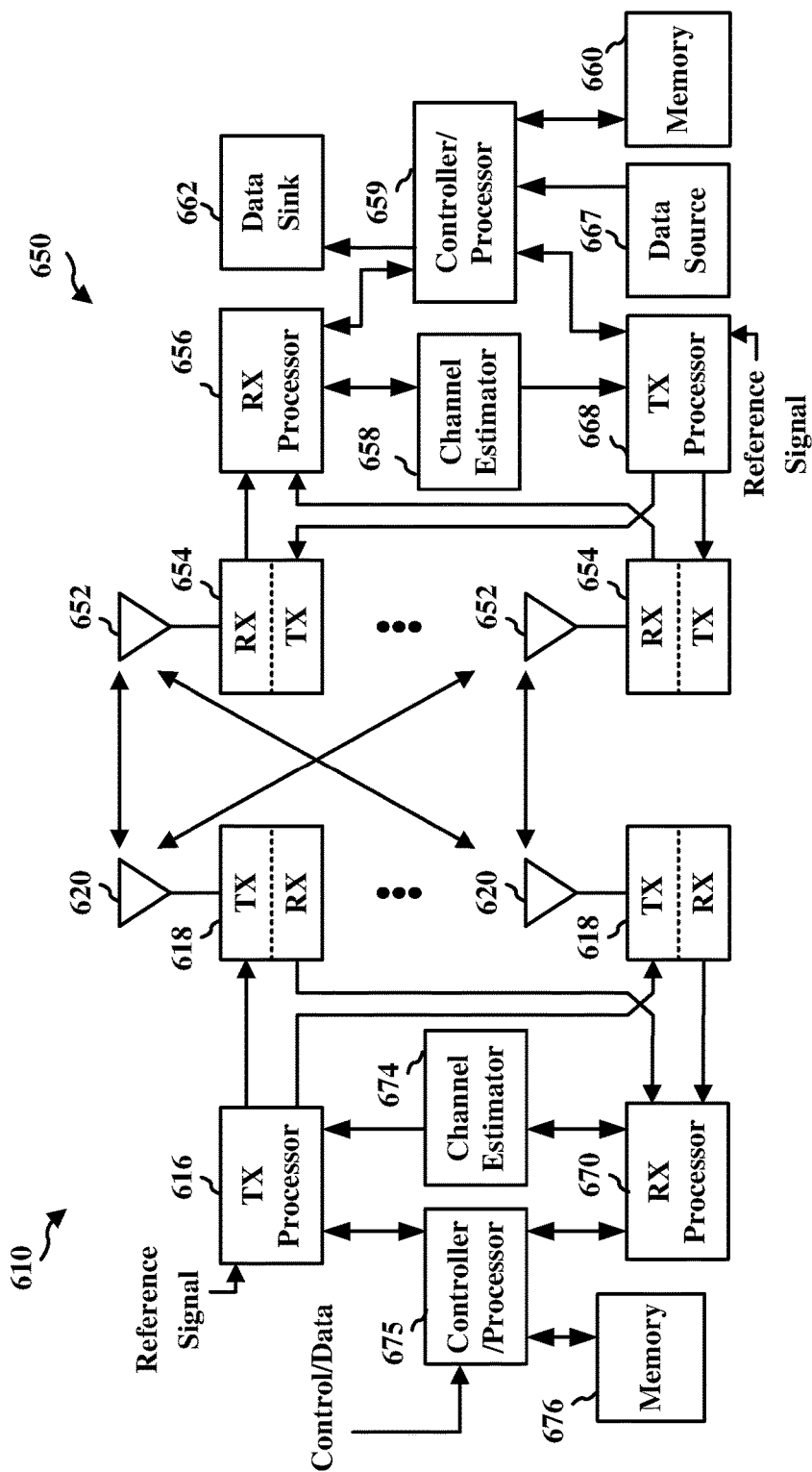
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
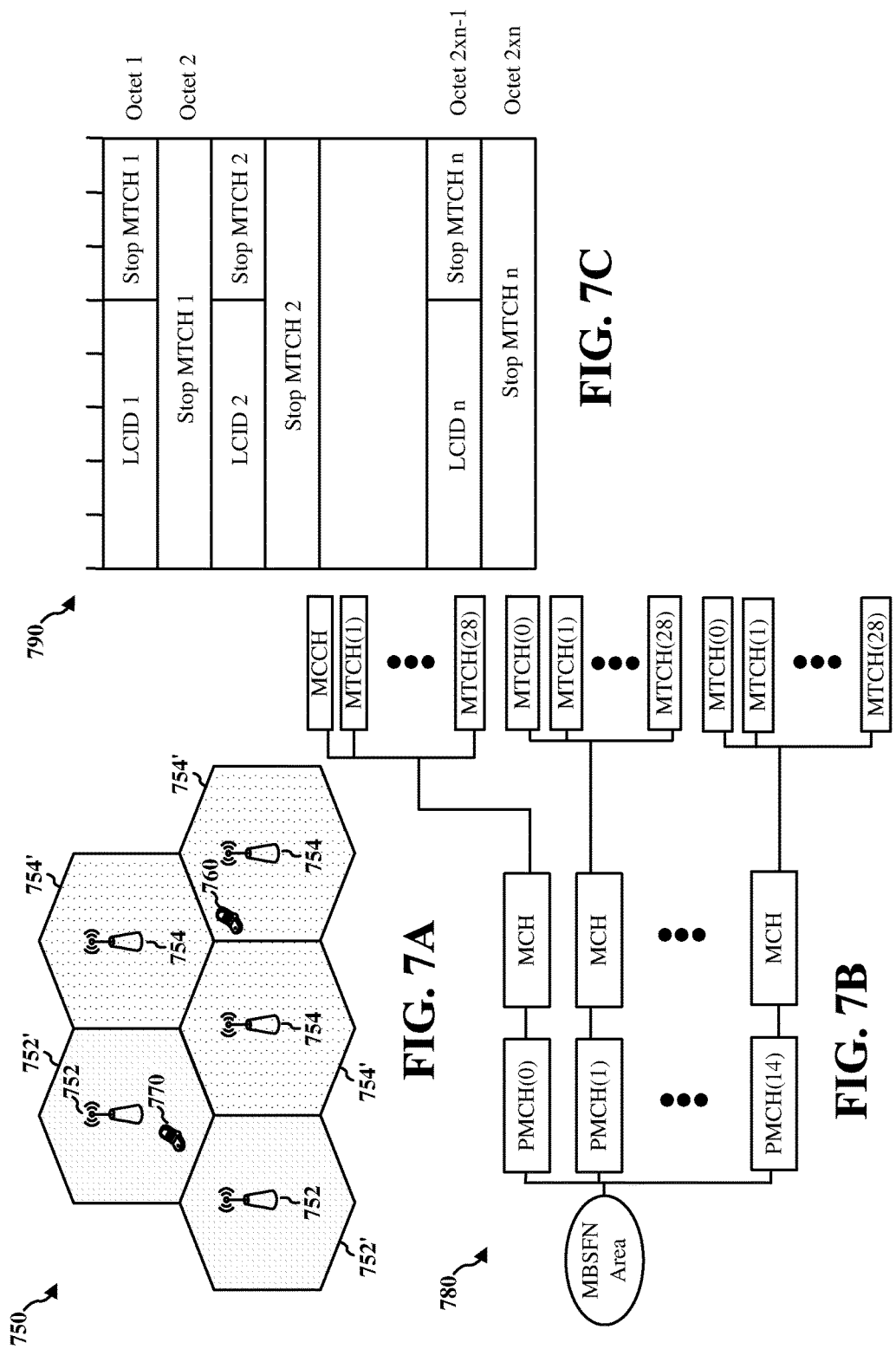
FIG. 7A is a diagram illustrating an example of an evolved Multimedia Broadcast Multicast Service channel configuration in a Multicast Broadcast Single Frequency Network (MBSFN).
FIG. 7B is a diagram illustrating an example of an MBSFN area.
FIG. 7C is a diagram illustrating a format of a Multicast Channel Scheduling Information Media Access Control (MAC) control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. FIG. 7B is a diagram 780 illustrating an example of an MBSFN area. As shown in FIG. 7B, each MBSFN area supports one or more physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a system information block (SIB) 13 (SIB13). Subsequently, based on the SIB13, the UE may acquire an MBSFN Area Configuration message on an MCCH. Subsequently, based on the MBSFN Area Configuration message, the UE may acquire an MCH scheduling information (MSI) MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7C is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area. A logical channel identifier (LCID) field (e.g., LCID 1, LCID 2, . . . , LCID n) may indicate a logical channel identifier of the MTCH. A Stop MTCH field (e.g., Stop MTCH 1, Stop MTCH 2, . . . , Stop MTCH n) may indicate the ordinal number of the subframe within the MCH scheduling period counting only the subframes allocated to the MCH, where the corresponding MTCH stops.

In one use case, when a network (e.g., eNB 106) experiences congestion, the MCE (e.g., MCE 128) may remove one or more MBMS sessions to reduce the network congestion. For example, if the MBMS network (e.g., eMBMS network) is congested while the UE receives a service through an MBMS session (e.g., eMBMS session), the MCE may suspend the MBMS session and the UE may continue to receive a corresponding version of the service of the MBMS session via a unicast bearer from a unicast server. In another use case, if the network determines that the number of users that are interested in an MBMS session within an MBSFN area is below the preconfigured threshold while the UE receives a service through an MBMS session (e.g., eMBMS session), the MCE may decide to suspend/stop the MBMS session in that MBSFN area and the UE may continue to receive a corresponding version of the service of the MBMS session via a unicast bearer from the unicast server. It is noted that the above features may be implemented for group call eMBMS congestion management, for example.

When the MCE suspends/stops the MBMS session, the UE may transition from receiving the service of the MBMS session to receiving a corresponding version of the service of the MBMS session via unicast. During such transition, the network may take some time to establish the unicast bearer. In general, when the UE receives a message (e.g., an MCCH message) indicating that the MBMS session is suspended, the UE determines that the MBMS session is suspended and initiates establishment of the unicast bearer by requesting the network to establish the unicast bearer with the UE. Because the UE generally requests establishment of the unicast bearer after the MBMS session is suspended, the unicast bearer used to receive the service over unicast may not be established when the MBMS session is suspended. If the unicast is not established when the MBMS session is suspended, the UE may experience interruption in the service for the time duration the network takes to establish the unicast bearer with the UE after the MBMS session is suspended. For example, if the network takes 200 ms to establish the unicast bearer, the UE may experience interruption of the service for at least 200 ms after the MBMS session is suspended. Thus, it is desirable for the network to notify the UE of suspension of an eMBMS session in advance such that the network may have sufficient time to establish the unicast bearer before the suspension of the eMBMS session, so as to reduce service interruption and to achieve service continuity when the UE the switches from service reception via eMBMS to unicast reception.

According to a first approach, information communicated over the MCCH may provide an early notification of suspension of an eMBMS session. According to a first aspect of the first approach, when the network (e.g., an MCE and/or an eNB) determines to suspend an MBMS session (e.g., while the UE is receiving a service through the MBMS session), the network waits until the next MCCH modification period (e.g., a first MCCH modification period) to notify the UE about the change. During the first MCCH modification period, the network sends the UE a notification about the changes in MCCH information (e.g., via a PDCCH channel). During a second MCCH modification period following after the first MCCH modification period, the network sends updated MCCH information to the UE, where the updated MCCH information indicates that the MBMS session will be suspended in a following MCCH modification period (e.g., a third MCCH modification period). The updated MCCH information sent to the UE may be associated with an MBSFN Area Configuration message. Upon receiving the updated MCCH information indicating the upcoming suspension of the MBMS session, the UE, in the second MCCH modification period, requests the network to establish a unicast bearer for a unicast service corresponding to the MBMS session. The UE may continue to monitor an MTCH corresponding to the MBMS session to be suspended while the unicast bearer is established during the second MCCH modification period.

In a third MCCH modification period following the second MCCH modification period, the eMBMS session is suspended. For example, in the third MCCH modification period, the network may remove a TMGI that identifies the service of the MBMS session in order to suspend the MBMS session. In the third MCCH modification period, the network may send updated MCCH information (e.g., an MBSFN Area Configuration message) indicating that the MBMS session is removed. For example, in the third MCCH modification period, if the UE receives an MBSFN Area Configuration message indicating that the TMGI that identifies the service of the MBMS session is not present, the UE will stop monitoring the MTCH associated with the suspended MBMS session and will continue to receive a corresponding unicast version of the service of the MBMS session via the unicast bearer. Because the UE requests the network to establish the unicast bearer before the third MCCH modification period, the UE may continue to receive the service over unicast with little or no service interruption when the MBMS session is suspended in the third MCCH modification period. It is noted that, according to the first aspect of the first approach, the MBMS session is suspended after two MCCH modification periods (e.g., after the first and second MCCH modification periods) following the determination to suspend an MBMS session.

According to a second aspect of the first approach, when the network (e.g., an MCE and/or an eNB) determines to suspend an MBMS session (e.g., while the UE is receiving a service via the MBMS session), the network may not send the UE a notification of the changes in MCCH information. Thus, after the network determines to suspend an MBMS session, during the next MCCH modification period (a first MCCH modification period), the network sends the updated MCCH information to the UE, where the updated MCCH information indicates that the network is about to suspend the MBMS session in the following MCCH modification period. The updated MCCH information sent to the UE may be an MBSFN Area Configuration message. Upon receiving the updated MCCH information indicating the upcoming suspension of the MBMS session, the UE requests the network in the first MCCH modification period to establish a unicast bearer for a unicast service corresponding to the service of the MBMS session. The UE may continue to monitor a corresponding MTCH carrying the eMBMS service while the unicast bearer is established during the first MCCH modification period. In a second MCCH modification period following the first MCCH modification period, the MBMS session is suspended. For example, in the second MCCH modification period, the network may remove a TMGI that identifies the service of the MBMS session in order to suspend the MBMS session. It is noted that the UE initiates establishment of the unicast bearer before the second MCCH modification period.

In the second MCCH modification period, the network may send updated MCCH information (e.g., an MBSFN Area Configuration message) indicating that the MBMS session is suspended. For example, in the second MCCH modification period, if the UE receives an MBSFN Area Configuration message indicating that the TMGI identifying the service of the MBMS session is not present, the UE will stop monitoring the corresponding MTCH and will switch to receiving a corresponding version of the service of the MBMS session via the unicast bearer. Because the network establishes the unicast bearer before the second MCCH modification period, the UE may continue to receive the service over unicast with reduced or no service interruption when the MBMS session is suspended in the second MCCH modification period. Thus, according to the second aspect of the first approach, the MBMS session is suspended after one MCCH modification period (e.g., the first MCCH modification period) following the determination to suspend an MBMS session.

Figure 8:
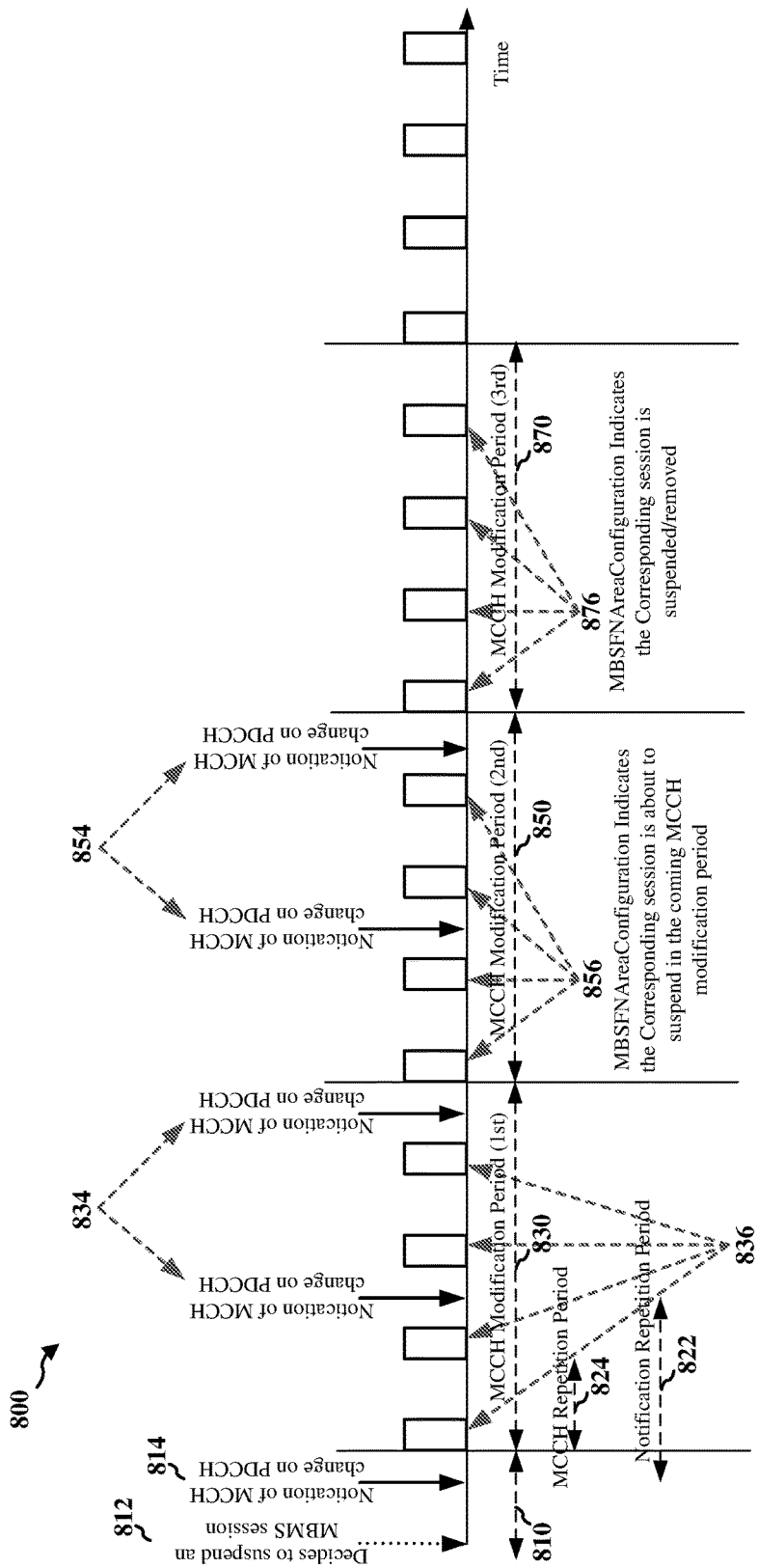
FIG. 8 is an example diagram illustrating the first aspect of the first approach according to the disclosure.

FIG. 8 is an example diagram 800 illustrating the first aspect of the first approach according to the disclosure. During an initial time period 810, after the network decides to suspend an MBMS session at 812, the UE receives a notification of MCCH change (e.g., on a PDCCH) at 814. The UE receives the notification of MCCH change at every notification repetition period 822. After the network has decided to suspend the MBMS session at 812, MCCH modification periods begin with a first MCCH modification period 830. During the first MCCH modification period 830, the UE starts receiving MCCH information 836 from the network periodically at every MCCH repetition period 824, and also continues to receive the notification of MCCH change 834 periodically. During a second MCCH modification period 850 following after the first MCCH modification period 830, the UE receives an MBSFN area configuration message 856 from the network periodically, where the MBSFN area configuration message 856 indicates that the MBMS session will be suspended in the upcoming MCCH modification period. Upon receiving the MBSFN area configuration message 856 indicating the upcoming suspension of the MBMS session, during the second MCCH modification period 850, the UE requests establishment of the unicast bearer and the network establishes the unicast bearer such that the UE may receive the service corresponding to the MBMS service over unicast. During the second MCCH modification period 850, the UE continues to receive the notification of MCCH change 854 periodically (e.g., at every notification repetition period).

During the third MCCH modification period 870 following after the second MCCH modification period 850, the UE receives an MBSFN area configuration message 876 from the network periodically, where the MBSFN area configuration message 876 indicates that the MBMS session has been suspended. The network finishes establishing the unicast bearer in the second MCCH modification period 850 before the third MCCH modification period 870. Hence, the UE can start receiving the corresponding service via unicast of the suspended MBMS session as the network suspends the MBMS session at the beginning of the third MCCH modification period 870, with reduced service discontinuity or interruption caused by the time the network takes to establish the unicast bearer. It is noted that, according to the second aspect of the first approach, the UE takes two MCCH modification periods (e.g., the first MCCH modification period 830 and the second MCCH modification period 850) after the decision to suspend the MBMS session, so as to be ready to receive the service over unicast while the MBMS session is suspended.

Figure 9:
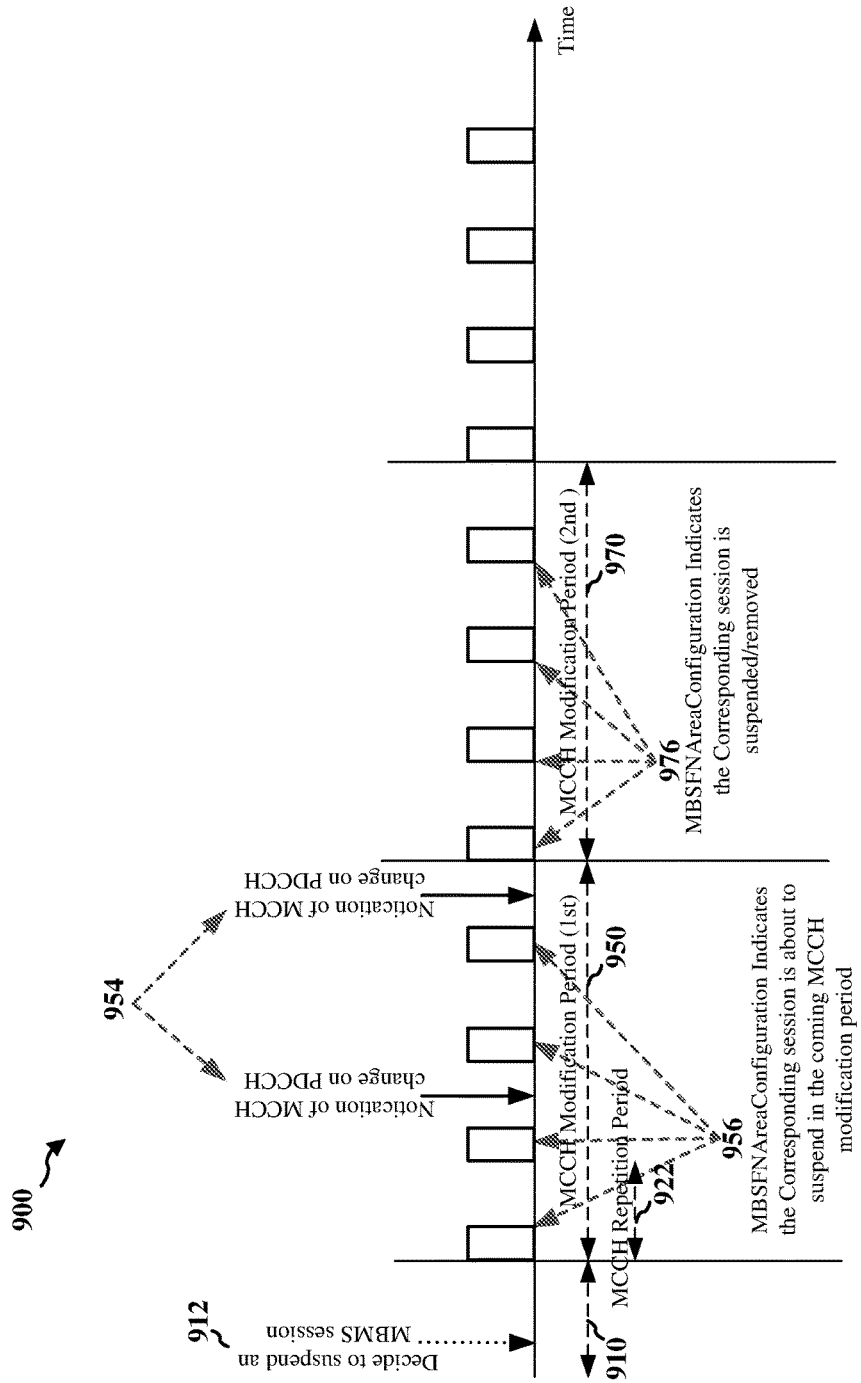
FIG. 9 is an example diagram illustrating the second aspect of the first approach according to the disclosure.

FIG. 9 is an example diagram 900 illustrating the second aspect of the first approach according to the disclosure. During an initial time period 910, the network decides to suspend an MBMS session at 912. According to the second aspect of the first approach, the UE may not receive a notification of MCCH change during the initial time period 910. During the first MCCH modification period 950 following after the initial time period 910, the UE receives an MBSFN area configuration message 956 from the network periodically, where the MBSFN area configuration message 956 indicates that the MBMS session is about to be suspended in the upcoming MCCH modification period. The MBSFN area configuration message 956 may be associated with MCCH information that the UE receives from the network. The MBSFN area configuration message 956 may be received periodically at every MCCH repetition period 922. During the first MCCH modification period 950, the UE receives a notification of MCCH change 954 periodically. Upon receiving the MBSFN area configuration message 956 indicating the upcoming suspension of the MBMS session, during the first MCCH modification period 950, the UE requests establishment of the unicast bearer and the network establishes the unicast bearer such that the UE may receive the corresponding version of the service of the MBMS service over unicast.

During the second MCCH modification period 970 following after the first MCCH modification period 950, the UE receives an MBSFN area configuration message 976 from the network periodically, where the MBSFN area configuration message 976 indicates that the MBMS session has been suspended. The network finishes establishing the unicast bearer in the first MCCH modification period 950 before the second MCCH modification period 970. Hence, the UE can start receiving the service corresponding to the suspended MBMS session over unicast as the network suspends the MBMS session at the beginning of the second MCCH modification period 970, without service discontinuity or interruption caused by the time the network takes to establish the unicast bearer. It is noted that, according to the second aspect of the first approach, it takes the UE one MCCH modification period (e.g., the first MCCH modification period 950) after the decision to suspend the MBMS session, so as to be ready to receive the service over unicast when the MBMS session is suspended.

In the first approach, compared to the first aspect that waits one MCCH modification period after the determination to suspend the MBMS service and then initiates establishment of the unicast bearer, the second aspect initiates establishment of the unicast bearer during the first MCCH modification period after the determination to suspend the MBMS service. Thus, after the determination to suspend the MBMS service, the second aspect finishes establishing the unicast bearer after one MCCH modification period whereas the first aspect finishes establishing the unicast bearer after two MCCH modification periods. Therefore, the second aspect may take shorter time than the first aspect to establish the unicast bearer. Because the second aspect may take shorter time than the first aspect to establish the unicast bearer, the second aspect may allow the UE to receive the service over unicast sooner than the first aspect.

FIG. 10 is a portion of an example MBSFN area configuration message 1000 that illustrates an implementation of an MBSFN area configuration message, according to the first approach of the disclosure. The portion of the MBSFN area configuration message 1000 may be modified to include an MBMS suspension indicator 1010 that indicates whether a corresponding MBMS session is about to be suspended/stopped or not in an upcoming MCCH modification period.

According to a second approach, an early notification of suspension of an eMBMS session may be based on an MSI received during a current MSP. When the network (e.g., an MCE) determines to suspend an MBMS session, the network may use the MSI to indicate to the UE that an MTCH (the MTCH associated with an LCID) corresponding to the MBMS session will be suspended, e.g., in a few following MCH scheduling periods (MSPs), thus suspending the MBMS session. It is noted that an LCID is associated with a TMGI, where the TMGI is a unique identifier that identifies the service of the MBMS session. In a first aspect of the second approach, when the network determines to suspend an MBMS session, the network may provide to the UE an MSI with a repeated LCID associated with an MTCH that corresponds to the MBMS session, in order to notify the UE that the MBMS session is about to be suspended. In other words, repetition of a specific LCID in the MSI indicates to the UE that the MTCH and the corresponding MBMS session associated with the specific LCID are about to be suspended. The MSI may include multiple repeated LCIDs, which may indicate that multiple MBMS sessions corresponding to the multiple repeated LCIDs may be suspended. The MSI may also include a reserved value associated with the repeated LCID to indicate when the MBMS session will be suspended. For example, the reserved value may indicate how many MSPs later the corresponding MTCH will be suspended. In one implementation, the reserved value may be either 2043 (binary: 11111111011) or 2046 (binary: 11111111100). In such implementation, for example, the reserved value of 2043 may indicate that the MTCH will be suspended in 1 MSP after the current MSP, and thus the MBMS session corresponding to the MTCH will also be suspended in 1 MSP after the current MSP. For example, the reserved value of 2046 may indicate that the MTCH will be suspended in 2 MSPs after the current MSP, and thus the MBMS session corresponding to the MTCH will also be suspended in 2 MSPs after the current MSP. In another implementation, any unused values from 1536 to 2042 may be utilized as a reserved value to indicate when the MTCH session will be suspended. It is noted that each reserved value may be mapped to a multiple of MSPs to represent a time duration before the suspension of the MBMS session occurs.

In a second aspect of the second approach, a new MSI format may be utilized. According to the second aspect of the second approach, when the network determines to suspend an MBMS session, the network may provide to the UE an MSI that additionally includes at the end of the MSI a specific LCID and a suspension indicator associated with the specific LCID. The specific LCID is a repeated LCID of one of the LCIDs in the MSI. The suspension indicator associated with the specific LCID indicates that the MTCH associated with the specific LCID will be suspended, thus suspending the MBMS session corresponding to the MTCH. The suspension indicator may indicate when the MTCH associated with the specific LCID will be suspended. For example, the suspension indicator may include three bits that can be set to a specific number of MSPs, where the MTCH and the corresponding MBMS session are expected to be suspended after MSPs of the specific number. For example, the suspension indicator including "001" may indicate that the MTCH will be suspended in 1 MSP after the current MSP, thus suspending the corresponding MBMS session in 1MSP after the current MSP. For example, the suspension indicator including "002" may indicate that the MBMS session will be suspended in 2 MSPs after the current MSP, thus suspending the corresponding MBMS session in 2MSPs after the current MSP. The MSI may include multiple specific LCIDs with respective suspension indicators, indicating that multiple MBMS sessions corresponding to the multiple repeated LCIDs may be suspended.

Figures 11A, 11B:
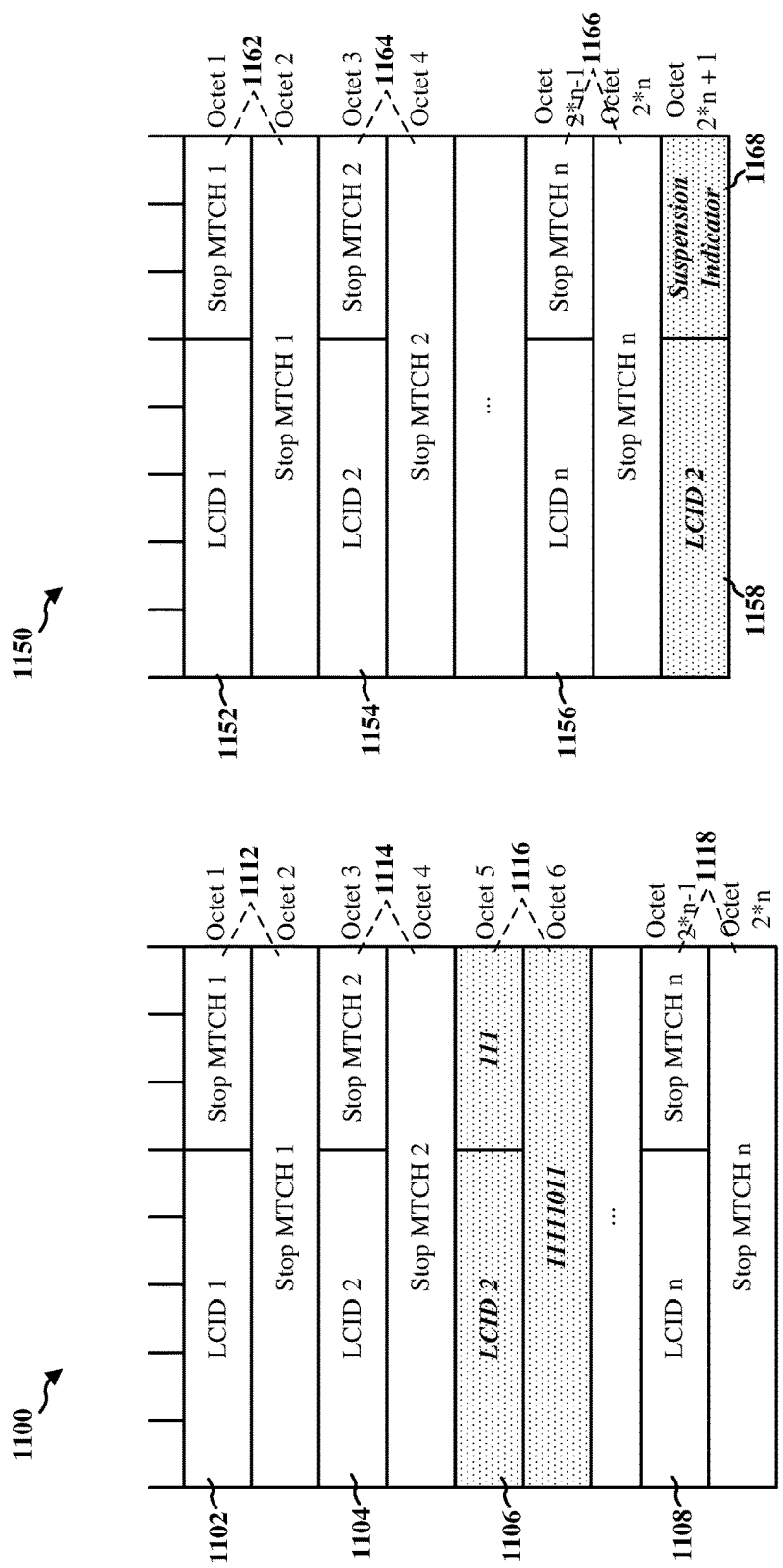
FIG. 11A is an example diagram of a multicast channel scheduling information (MSI) MAC control element according to the first aspect of the second approach.
FIG. 11B is an example diagram of an MSI MAC control element according to the second aspect of the second approach.

FIG. 11A is an example diagram 1100 of an MSI MAC control element according to the first aspect of the second approach. The UE receives an MSI with the MAC control element during a current MSP. The LCID fields 1102, 1104, and 1108 indicate respectively the Logical Channel IDs of the respective MTCHs. The length of each LCID field may be 5 bits. The stop MTCH field indicates a last subframe number assigned for a corresponding LCID. Thus, the stop MTCH fields 1112, 1114, and 1118 indicate respective subframe numbers where respective MTCHs stop for the LCID fields 1102, 1104, and 1108, respectively. In this example, the length of each stop MTCH field may be 11 bits. The LCID field 1104 includes LCID 2, and the LCID field 1106 also includes LCID 2, which is repetition of LCID 2. Thus, the LCID field 1106 shows that LCID 2 is repeated in the LCID field 1106. The repeated LCID 2 in the LCID field 1106 indicates that an MTCH associated with LCID 2 will be suspended, and thus an MBMS session corresponding to the MTCH will be suspended. A Stop MTCH field corresponding to the repeated LCID 2 in the LCID field 1106 is used as a reserved value field 1116 for a reserved value to indicate when the MTCH associated with a repeated LCID (e.g., LCID 2) will be suspended. The reserved value field 1116 indicates a binary number 11111111011, which is 2043 in decimal. For example, the reserved value of 2043 may indicates that an MTCH will be suspended in 1 MSP. Hence, in the example diagram 1100, the LCID field 1106 with the repeated LCID 2 and the reserved value field 1116 indicate that the MTCH associated with LCID 2 will be suspended in 1 MSP after the current MSP, and thus the corresponding MBMS session will be suspended in 1 MSP after the current MSP. It is noted that the first aspect of the second approach uses two octets (Octet 5 and Octet 6) to indicate the upcoming suspension of the MBMS session. Other values for the reserved value field may be used to represent other time durations before the suspension of the MBMS session occurs in multiples of the MSP.

FIG. 11B is an example diagram 1150 of an MSI MAC control element according to the second aspect of the second approach. The UE receives an MSI with the MAC control element during a current MSP. The LCID fields 1152, 1154, and 1156 indicate respective the Logical Channel IDs of the respective MTCHs. The length of each LCID field may be 5 bits. The stop MTCH field indicates a last subframe number assigned for a corresponding LCID. Thus, the stop MTCH fields 1162, 1164, and 1166 indicate respective subframe numbers where respective MTCHs stop for the LCID fields 1152, 1154, and 1156, respectively. The length of each stop MTCH field may be 11 bits. In this example, an additional LCID field 1158 repeats LCID 2 to indicate that an MTCH associated with LCID 2 will be suspended, and thus an MBMS session corresponding to the MTCH will be suspended. A suspension indicator 1168 associated with the additional LCID field 1158 indicates when the MTCH associated with LCID 2 will be suspended. For example, the suspension indicator 1168 may indicate a time duration before the LCID 2 will be suspended in a multiple of an MSP, where the time duration indicated in the suspension indicator 1168 is the time duration after the current MSP. It is noted that the second aspect of the second approach uses one octet (Octet 2*n+1) to indicate the upcoming suspension of the MBMS session.

According to a third aspect of the second approach, the timeline of the MSI and the MTCH transmission may be modified to indicate upcoming suspension/stop of an MBMS session. In particular, during a current MSP, the UE receives an MSI of a subsequent MSP, instead of receiving an MSI of the current MSP. Thus, for example, in a case where the MCE determines to suspend an MBMS session (e.g., thus determining to suspend/stop a corresponding MTCH) in a second MSP subsequent to a first MSP, the UE may receive during the first MSP an MSI corresponding to the second MSP. The MSI corresponding to the second MSP includes scheduling of one or more MBMS sessions for the second MSP, and thus may include indication to stop a specific MTCH at the second MSP. For example, the MSI corresponding to the second MSP may specify a special stop value "2047" for a "Stop MTCH" indication to indicate that a specific MTCH is not scheduled (e.g., thus indicating that the specific MTCH is suspended) in the second MSP. Because the UE determines during the first MSP based on the MSI corresponding to the second MSP that the MTCH will be suspended/stopped in the second MSP, the UE may request establishment of a unicast bearer during the first MSP. Therefore, upon the UE's request, the network may establish the unicast bearer to continue receiving the service corresponding to the MBMS session over unicast before the MTCH is stopped in the second MSP, thus reducing the MBMS service interruption and providing increased MBMS service continuity.

FIG. 12A is an example timeline 1200 illustrating the MSPs and MSIs according to a general implementation. The example timeline 1200 shows an initial MSP (MSP X−1) 1212, a first MSP (MSP X) 1214, and a second MSP (MSP X+1) 1216 in sequence. In the initial MSP (MSP X−1) 1212, the UE receives an MSI (MSI X−1) 1222 corresponding to the initial MSP (MSP X−1) 1212. In the first MSP (MSP X) 1214, the UE receives an MSI (MSI X) 1224 corresponding to the first MSP (MSP X) 1214. In the second MSP (MSP X+1) 1216, the UE receives an MSI (MSI X+1) 1226 corresponding to the second MSP (MSP X+1) 1216. If the MCE determines to suspend an MBMS session after the first MSP (MSP X) 1214, during the second MSP (MSP X+1) 1216, the UE receives the MSI (X+1) 1216 corresponding to the second MSP 1216, where the MSI (X+1) 1216 indicates to stop the MTCH corresponding to the MBMS session. Thus, in the second MSP (MSP X+1) 1216, the MBMS session is suspended/stopped, and the UE requests the network to establish a unicast bearer. Therefore, when the MBMS session is suspended/stopped in the second MSP (MSP X+1) 1216, the UE does not receive a service until the network establishes the unicast bearer that is used to receive a service corresponding to the suspended MBMS session, which causes service interruption.

FIG. 12B is an example timeline 1250 illustrating the MSPs and MSIs according to a third aspect of the second approach of the disclosure. The example timeline 1200 shows an initial MSP (MSP X−1) 1262, a first MSP (MSP X) 1264, and a second MSP (MSP X+1) 1266 in sequence. Compared to the example timeline 1200 of FIG. 12A, the timeline for the MSI is shifted according to the second approach of the disclosure as illustrated in FIG. 12B. In particular, during a current MSP, the UE receives an MSI of a subsequent MSP. Thus, in the initial MSP (MSP X−1) 1262, the UE receives an MSI (MSI X) 1272 corresponding to the first MSP (MSP X) 1264. In the first MSP (MSP X) 1264, the UE receives an MSI (MSI X+1) 1274 corresponding to the second MSP (MSP X+1) 1266. Hence, if the network (e.g., the MCE) determines to suspend the MTCH during the second MSP (MSP X+1) 1266, the MSI (MSI X+1) 1274 corresponding to the second MSP (MSP X+1) 1266 indicates the suspension of the MTCH during the second MSP (MSP X+1) 1266. Therefore, upon receiving the MSI (MSI X+1) 1274 in the first MSP (MSP X) 1264, the UE requests the network to establish a unicast bearer that is used to receive a service corresponding to the suspended MBMS session via unicast. Thus, the network may establish the unicast bearer in the first MSP (MSP X) 1264 before the MTCH is suspended in the second MSP (MSP X+1) 1266. In the second MSP (MSP X+1) 1266, the UE receives an MSI (MSI X+2) 1276 corresponding to a third MSP subsequent to the second MSP (MSP X+1) 1266. In the second MSP (MSP X+1) 1266, the MBMS session is suspended as indicated in the MSI (MSI X+1) 1274, and the UE continues to receive the service corresponding the suspended MBMS session via unicast using the unicast bearer established during the first MSP (MSP X) 1264, without experiencing service interruption.

According to a third approach, a reserved value of an LCID for an MCH may be used to indicate which MBMS session is about to be suspended. For example, the reserved value of an LCID for an MCH may be "11101." The reserved value of an LCID may be used to include a new MAC control element with a suspension indicator. In an aspect, in addition to an existing MSI MAC control element, an additional MSI MAC control element with a suspension indicator may be utilized in a MAC payload of a MAC protocol data unit (PDU). For example, the reserved value may be used for the additional MSI MAC control element with the suspension indicator. The suspension indicator associated with a specific LCID indicates when an MTCH associated with the specific LCID will be suspended, and thus indicates when an MBMS session corresponding to the MTCH will be suspended. Based on the suspension indicator, the UE may requests establishment of a unicast bearer and the network may establish the unicast bearer before the MBMS session is suspended such that the UE may receive the service corresponding to the suspended MBMS service over unicast when the MBMS session is suspended, with little or no service interruption. In one aspect, the suspension indicator may further indicate when the corresponding MTCH will be suspended. For example, the suspension indicator may further indicate how many MSPs later the corresponding MTCH will be suspended.

Figures 13A, 13B:
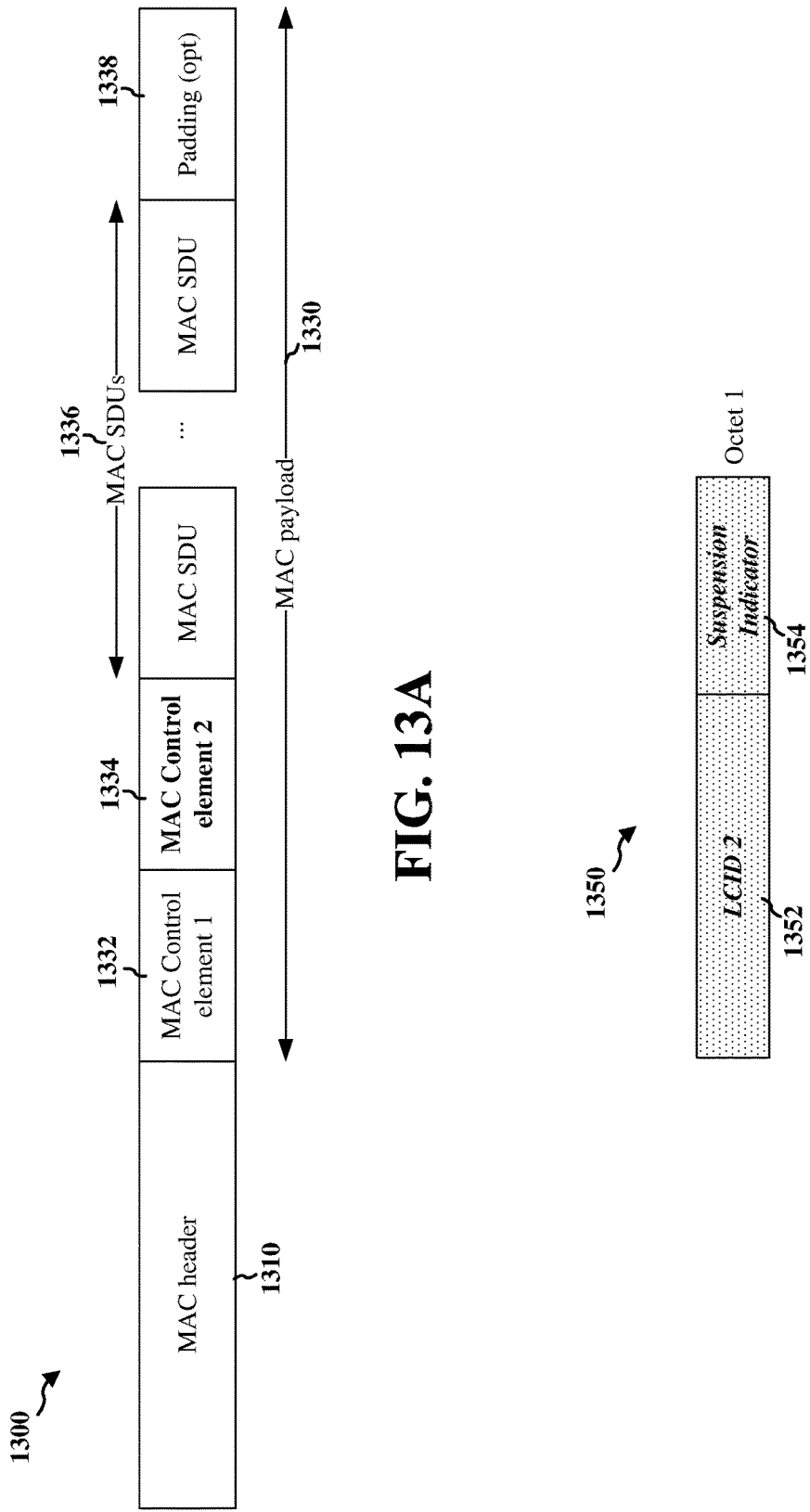
FIG. 13A is an example diagram illustrating a MAC protocol data unit (PDU) according to the third approach of the disclosure.
FIG. 13B is an example diagram illustrating an additional MAC control element according to the third approach of the disclosure.

FIG. 13A is an example diagram 1300 illustrating a MAC PDU according to the third approach of the disclosure. The MAC PDU includes a MAC header 1310 and a MAC payload 1330. The MAC payload 1330 includes one or more MAC control elements such as MAC control element 1 1332 and MAC control element 2 1334 (additional MAC control element). The MAC control element 2 1334 may be utilized to include a suspension indicator for a specific LCID to indicate when an MTCH associated with the specific LCID will be suspended, thus indicating when an MBMS session corresponding to the MTCH will be suspended. The MAC payload 1330 may also include MAC service data units (MAC SDUs) 1336 and a padding 1338. FIG. 13B is an example diagram 1350 illustrating an additional MAC control element according to the third approach of the disclosure. The additional MAC control element illustrated in the example diagram 1350 (e.g., such as the MAC control element 2 1334 of FIG. 13A) includes an LCID field 1352 and a suspend indicator 1354 associated with the LCID field 1352. In this example, the LCID field 1352 indicates LCID 2, and the suspend indicator 1354 indicates when the MTCH associated with LCID 2 will be suspended. Thus, when the UE receives the additional MAC control element (as illustrated in the example diagram 1350), the UE may initiate establishment of a unicast bearer such that the network may establish the unicast bearer before suspension of the MBMS session, and thus the UE may continue receiving the service corresponding to the MBMS session that corresponds to LCID 2 over unicast using the unicast bearer upon suspension of the MBMS session.

Figure 14:
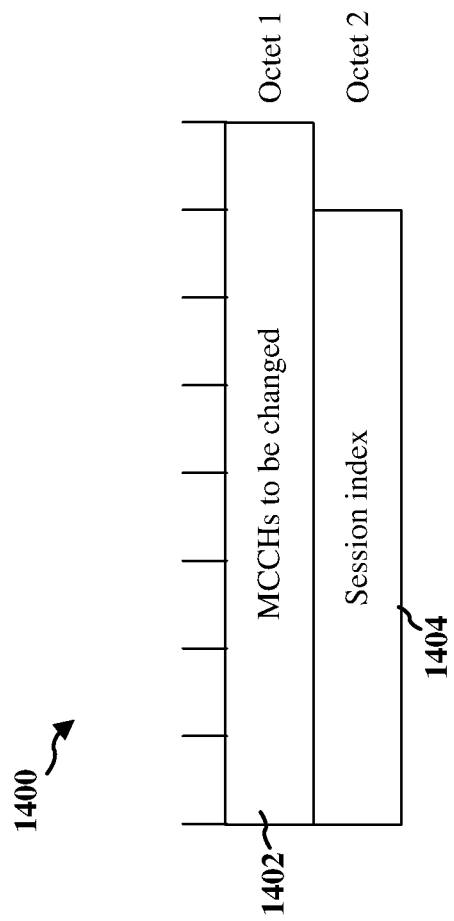
FIG. 14 is an example diagram illustrating a downlink control indicator (DCI) format 1C according to the fourth approach of the disclosure.

According to a fourth approach, a downlink control indicator (DCI) format 1C message may be utilized to indicate suspension of an MBMS session. The DCI format 1C message whose cyclic redundancy check (CRC) is scrambled with a radio network temporary identifier (RNTI) may indicate to the UE that the MBMS session will be suspended in a next MCCH modification period, such that the UE may request the network to establish a unicast bearer based on such indication. The RNTI may be used to scramble a CRC of the DCI format 1C message. Thus, upon the UE's request, the network may establish the unicast bearer before the next MCCH modification period during which the MBMS session is suspended. Because the UE requests the establishment of the unicast bearer and the network establishes the unicast bearer before the next MCCH modification period, when the MBMS session is suspended in the next MCCH modification period, the UE may continue the service corresponding to the suspended MBMS session in the next MCCH modification period, with little or no service interruption. In an aspect, the UE may receive an MCCH change notification using the DCI format 1C message whose CRC is scrambled with an M-RNTI. The DCI format 1C message may further include suspension information to indicate which MBMS session/MTCH will be suspended in a next MCCH modification period. For example, when the DCI format 1C message is used to send the MCCH change notification to the UE, eight bits of the DCI format 1C message are generally used to indicate which MCCH will be changed in a next MCCH modification period (e.g., as the MCCH change notification), and the remaining bits of the DCI format 1C message may be utilized to include the suspension information to indicate which MBMS session/MTCH will be suspended in the next MCCH modification period. FIG. 14 is an example diagram 1400 illustrating a DCI format 1C message according to the fourth approach of the disclosure. The DCI format 1C message illustrated in the example diagram 1400 may include an MCCH change notification in an MCCH field 1402 to indicate which MCCH will be changed in a next MCCH modification period. The DCI format 1C message illustrated in the example diagram 1400 may also include a session index 1404 that includes the suspension information. The session index 1404 is mapped to an MBMS session/MTCH, such that the UE may determine which MBMS session will be suspended in the next MCCH modification period based on the session index 1404. The UE may receive from the network mapping information to map between the at least one session index and the at least one MBMS session to be suspended via at least one of application layer signaling, a SIB13, an MCCH, or dedicated RRC signaling and configuration.

As an alternative aspect, a new RNTI may be defined for the eNB to notify the MBMS session suspension. Thus, the UE may receive an MCCH change notification via the DCI format 1C message whose CRC is scrambled with a newly-defined RNTI. The DCI format 1C message whose CRC is scrambled with the newly-defined RNTI may include one or more session indexes and/or may include information to directly specify an MBMS session to be suspended in the next MCCH modification period. For example, the information to directly specify the MBMS session to be suspended may include at least one of an MBSFN area identifier, a PMCH identifier, or an MTCH identifier.

Figure 15:
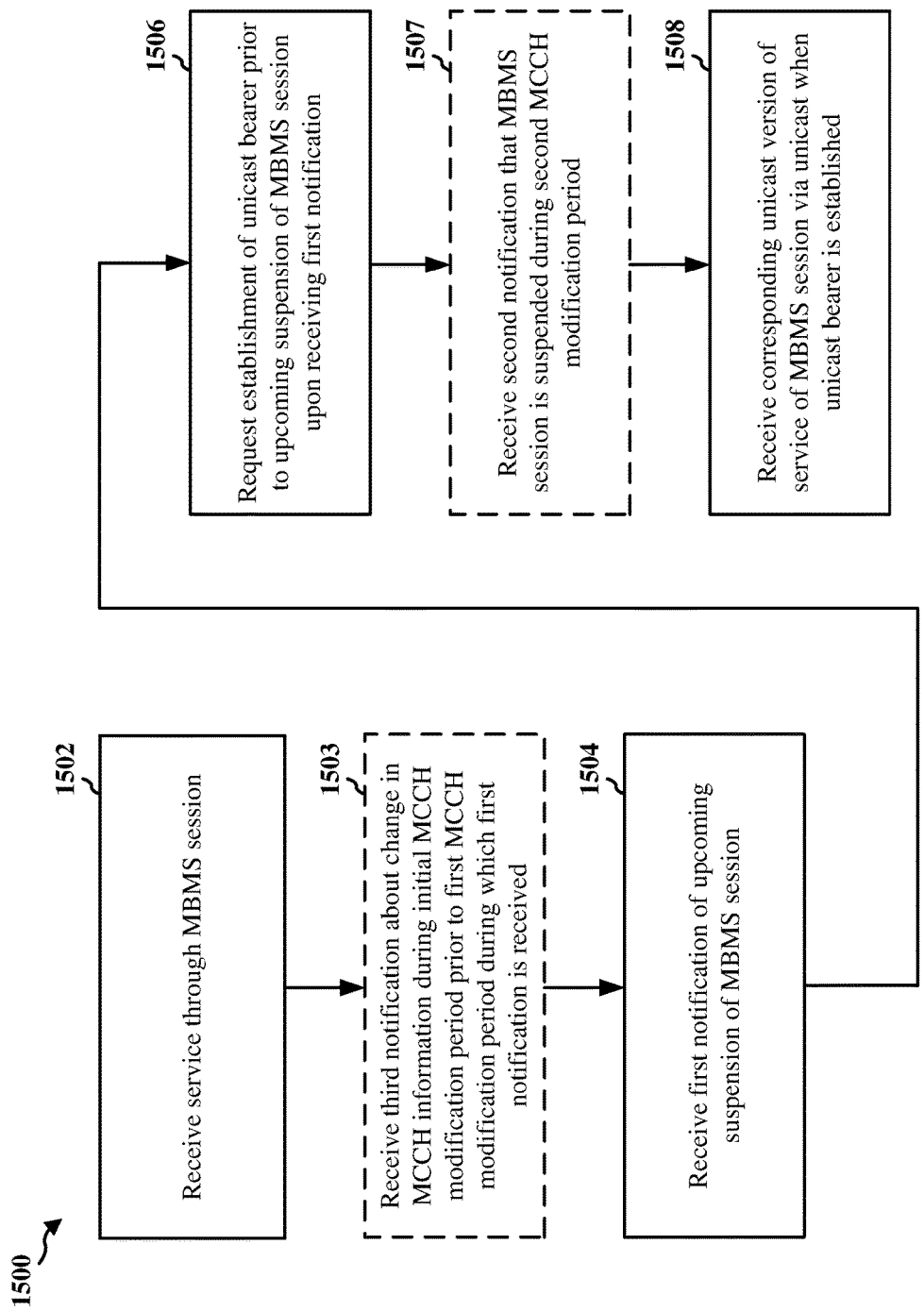
FIG. 15 is a flow chart of a method of wireless communication.

FIG. 15 is a flow chart 1500 of a method of wireless communication. The method may be performed by a UE (e.g., the UE 102, the apparatus 1602/1602'). At 1502, the UE receives a service through an MBMS session. At 1504, the UE receives a first notification of an upcoming suspension of the MBMS session. At 1506, the UE requests establishment of a unicast bearer prior to the upcoming suspension of the MBMS session upon receiving the first notification. At 1508, the UE receives a corresponding unicast version of the service of the MBMS session via unicast when the unicast bearer is established.

In one aspect, the first notification is received during a first MCCH modification period, the corresponding unicast version of the service is received via unicast during a second MCCH modification period, and the UE may receive at 1507 a second notification that the MBMS session is suspended during the second MCCH modification period. In such an aspect, the UE may receive the second notification via the MBSFN area configuration message sent to the UE during the first MCCH modification period. In an aspect, at 1503, the UE may receive a third notification about a change in MCCH information during an initial MCCH modification period prior to the first MCCH modification period during which the first notification is received. In such an aspect, the UE may receive the third notification when the upcoming suspension of the MBMS session is determined. In an aspect, the first notification is MCCH information. In an aspect, the MCCH information is associated with an MBSFN area configuration message.

In one aspect, for example, referring back to FIG. 9, during the first MCCH modification period 950 following after the initial time period 910, the UE receives an MBSFN area configuration message 956 from the network periodically, where the MBSFN area configuration message 956 indicates that the MBMS session is about to be suspended in the upcoming MCCH modification period. For example, as discussed supra, upon receiving the MBSFN area configuration message 956 indicating the upcoming suspension of the MBMS session, during the first MCCH modification period 950, the UE requests establishment of the unicast bearer and the network establishes the unicast bearer such that the UE may receive a corresponding unicast version of the MBMS service via unicast. For example, referring back to FIG. 9, during the second MCCH modification period 970 following after the first MCCH modification period 950, the UE receives an MBSFN area configuration message 976 from the network periodically, where the MBSFN area configuration message 976 indicates that the MBMS session has been suspended. For example, referring back to FIG. 9, because the network finishes establishing the unicast bearer in the first MCCH modification period 950 before the second MCCH modification period 970, the UE can start receiving a corresponding unicast version of the service of the suspended MBMS session over unicast as the network suspends the MBMS session at the beginning of the second MCCH modification period 970.

In another aspect, for example, referring back to FIG. 8, during the first MCCH modification period 830, the UE starts receiving MCCH information 836 from the network periodically at every MCCH repetition period 824, and also continues to receive the notification of MCCH change 834 periodically. For example, referring back to FIG. 8, during a second MCCH modification period 850 following after the first MCCH modification period 830, the UE receives an MBSFN area configuration message 856 from the network periodically, where the MBSFN area configuration message 856 indicates that the MBMS session will be suspended in the upcoming MCCH modification period. For example, as discussed supra, upon receiving the MBSFN area configuration message 856 indicating the upcoming suspension of the MBMS session, during the second MCCH modification period 850, the UE requests establishment of the unicast bearer and the network establishes the unicast bearer such that the UE may receive the service corresponding to the MBMS service over unicast. For example, referring back to FIG. 8, during the third MCCH modification period 870 following after the second MCCH modification period 850, the UE receives an MBSFN area configuration message 876 from the network periodically, where the MBSFN area configuration message 876 indicates that the MBMS session has been suspended. For example, referring back to FIG. 8, because the network finishes establishing the unicast bearer in the second MCCH modification period 850 before the third MCCH modification period 870, the UE can start receiving the corresponding unicast version of the service over unicast as the network suspends the MBMS session at the beginning of the third MCCH modification period 870.

In an aspect, the UE receives at 1504 the first notification by receiving MSI that includes a set of LCIDs, and determining the MBMS session to be suspended based on an LCID of the set of LCIDs, where the LCID of the set of LCIDs is associated with a corresponding MTCH that corresponds to the MBMS session to be suspended. For example, as discussed supra, when the network (e.g., an MCE) determines to suspend an MBMS session, the network may use the MSI to indicate to the UE that an MTCH (the MTCH associated with a repeated LCID) corresponding to the MBMS session will be suspended, e.g., in a few MSPs, thus suspending the MBMS session.

In such an aspect, the UE receives at 1504 the first notification by further determining that the LCID associated with the corresponding MTCH is a repeated LCID of one of the set of LCIDs, and determining an expected time of the upcoming suspension based on a reserved value that is included in the MSI and is associated with the repeated LCID, where the establishment of the unicast bearer is requested prior to the expected time of the upcoming suspension. In such an aspect, the reserved value associated with the repeated LCID is included in a Stop MTCH field associated with the repeated LCID in the MSI. In such an aspect, the reserved value indicates the expected time of the upcoming suspension, the expected time being based on a multiple of an MSP, and the expected time is later than time it takes to establish the unicast bearer.

For example, referring back to FIG. 11A, the repeated LCID 2 in the LCID field 1106 indicates that an MTCH associated with LCID 2 will be suspended, and thus an MBMS session corresponding to the MTCH will be suspended. For example, referring back to FIG. 11A, the LCID field 1106 with the repeated LCID 2 and the reserved value field 1116 indicate that the MTCH associated with LCID 2 will be suspended in 1 MSP, and thus the corresponding MBMS session will be suspended in 1 MSP. For example, referring back to FIG. 11A, a Stop MTCH field corresponding to the repeated LCID 2 in the LCID field 1106 is used as a reserved value field 1116 for a reserved value to indicate when the MTCH associated with a repeated LCID (e.g., LCID 2) will be suspended. For example, as discussed supra, an LCID is associated with a TMGI that identifies a service of an MBMS session. For example, as discussed supra, the reserved value may indicate how many MSPs later the corresponding MTCH will be suspended.

In such an aspect, the first notification in the MSI includes the LCID associated with the corresponding MTCH and a suspension indicator associated with the LCID that is associated with the corresponding MTCH, and the LCID of the set of LCIDs is associated with a TMGI that identifies the service of the MBMS session for the upcoming suspension. In such an aspect, the suspension indicator indicates an expected time of the upcoming suspension, the expected time being based on a multiple of an MSP, and the expected time is later than time it takes to establish the unicast bearer.

For example, referring back to FIG. 11B, an additional LCID field 1158 includes LCID 2 to indicate that an MTCH associated with LCID 2 will be suspended, and thus an MBMS session corresponding to the MTCH will be suspended. For example, as discussed supra, an LCID is associated with a TMGI that identifies a service of an MBMS session. For example, referring back to FIG. 11B, a suspension indicator 1168 associated with the additional LCID field 1158 indicates when the MTCH associated with LCID 2 will be suspended. For example, as discussed supra, the suspension indicator may include three bits that can be set to a specific number of MSPs, where the MTCH and the corresponding MBMS session are expected to be suspended after MSPs of the specific number.

In such an aspect, where the MSI is associated with a second MSP that is subsequent to a first MSP, the UE receives during the first MSP the MSI associated with the second MSP as the first notification, and the MSI associated with the second MSP includes an indication for the upcoming suspension to take place in the second MSP. In such an aspect, the establishment of the unicast bearer is requested when the MSI associated with the second MSP is received during the first MSP.

For example, as discussed supra, in a case where the MCE determines to suspend an MBMS session (e.g., thus determining to suspend/stop a corresponding MTCH) in a second MSP subsequent to a first MSP, the UE may receive during the first MSP an MSI corresponding to the second MSP. For example, as discussed supra, the MSI corresponding to the second MSP includes scheduling of one or more MBMS sessions for the second MSP, and thus may include indication to stop a specific MTCH at the second MSP. For example, as discussed supra, because the UE determines during the first MSP based on the MSI corresponding to the second MSP that the MTCH will be suspended/stopped in the second MSP, the UE may request establishment of a unicast bearer during the first MSP.

In an aspect, the first notification is included in an MAC control element. In such an aspect, the MAC control element includes an LCID and a suspension indicator associated with the LCID, and the suspension indicator associated with the LCID indicates that the MBMS session associated with the LCID will be suspended.

For example, as discussed supra, in addition to an existing MSI MAC control element, an additional MSI MAC control element with a suspension indicator may be utilized in a MAC payload of a MAC PDU. For example, as discussed supra, the suspension indicator associated with a specific LCID indicates when an MTCH associated with the specific LCID will be suspended, and thus indicates when an MBMS session corresponding to the MTCH will be suspended.

In an aspect, the first notification is received using a DCI format 1C message. In an aspect, a CRC of the DCI format 1C message is scrambled with an RNTI. In such an aspect, the RNTI may be an M-RNTI. In such an aspect, the DCI format 1C message includes information of at least one MCCH to be changed and at least one session index to indicate at least one MBMS session to be suspended. In an aspect, the receiving the first notification includes receiving mapping information between the at least one session index and the at least one MBMS session to be suspended via at least one of application layer signaling, a SIB13, an MCCH, or dedicated RRC signaling and configuration. For example, as discussed supra, the DCI format 1C message whose CRC is scrambled with an RNTI may indicate to the UE that the MBMS session will be suspended in a next MCCH modification period, such that the UE may request the network to establish a unicast bearer based on such indication. Thus, as discussed supra, the network may establish the unicast bearer before the next MCCH modification period. For example, referring back to FIG. 14, the DCI format 1C message illustrated in the example diagram 1400 may include an MCCH change notification in an MCCH field 1402 to indicate which MCCH will be changed in a next MCCH modification period, and may also include a session index 1404 that includes the suspension information to indicate which MBMS session/MTCH will be suspended in the next MCCH modification period. For example, referring back to FIG. 14, the session index 1404 is mapped to an MBMS session/MTCH, such that the UE may determine which MBMS session will be suspended in the next MCCH modification period based on the session index 1404. For example, referring back to FIG. 14, the UE may receive from the network mapping information to map between the at least one session index and the at least one MBMS session to be suspended via at least one of application layer signaling, a SIB13, an MCCH, or dedicated RRC signaling and configuration.

In another aspect, the DCI format 1C message includes at least one of an MBSFN area identifier, a PMCH identifier, or a MTCH identifier. For example, as discussed supra, in the DCI format 1C message whose CRC is scrambled with the new RNTI may include one or more session indexes and/or may include information to directly specify an MBMS session to be suspended in the next MCCH modification period. For example, as discussed supra, the information to directly specify the MBMS session to be suspended may include at least one of an MBSFN area identifier, a PMCH identifier, or an MTCH identifier.

Figure 16:
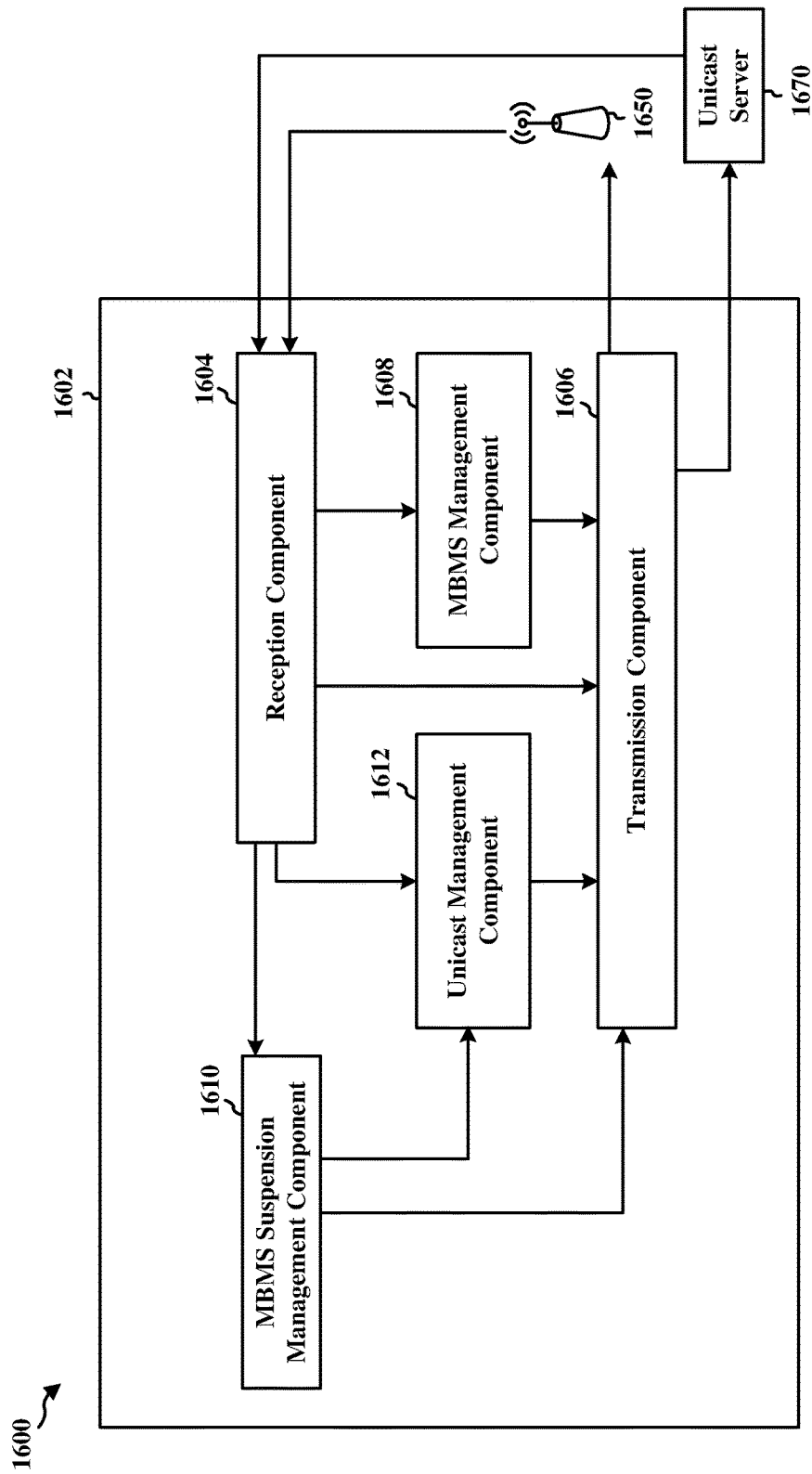
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be a UE. The apparatus includes a reception component 1604, a transmission component 1606, an MBMS management component 1608, an MBMS suspension management component 1610, and a unicast management component 1612.

The reception component 1604 and the MBMS management component 1608 receive a service through an MBMS session, from an eNB 1650. The reception component 1604 and an MBMS suspension management component 1610 receive a first notification of an upcoming suspension of the MBMS session. The unicast management component 1612 and the transmission component 1606 request establishment of a unicast bearer with a unicast server 1670 prior to the upcoming suspension of the MBMS session upon receiving the first notification. The reception component 1604 and the unicast management component 1612 receive a corresponding unicast version of the service of the MBMS session via unicast when the unicast bearer is established with the unicast server 1670.

In one aspect, the first notification is received during a first MCCH modification period, the corresponding unicast version of the service is received via unicast during a second MCCH modification period, and the reception component 1604 and an MBMS suspension management component 1610 may receive a second notification that the MBMS session is suspended during the second MCCH modification period. In such an aspect, the reception component 1604 and an MBMS suspension management component 1610 may receive the second notification via the MBSFN area configuration message sent to the UE during the first MCCH modification period. In an aspect, the reception component 1604 and an MBMS suspension management component 1610 may receive a third notification about a change in MCCH information during an initial MCCH modification period prior to the first MCCH modification period during which the first notification is received. In such an aspect, the UE may receive the third notification when the upcoming suspension of the MBMS session is determined. In an aspect, the first notification is MCCH information. In an aspect, the MCCH information is associated with an MBSFN area configuration message.

In an aspect, the MBMS suspension management component 1610 receives, through the reception component 1604, MSI that includes a set of LCIDs, and determines the MBMS session to be suspended based on an LCID of the set of LCIDs, where the LCID of the set of LCIDs is associated with a corresponding MTCH that corresponds to the MBMS session to be suspended.

In such an aspect, the MBMS suspension management component 1610 further determines that the LCID associated with the corresponding MTCH is a repeated LCID of one of the set of LCIDs, and determines an expected time of the upcoming suspension based on a reserved value that is included in the MSI and is associated with the repeated LCID, where the establishment of the unicast bearer is requested prior to the expected time of the upcoming suspension. In such an aspect, the reserved value associated with the repeated LCID is included in a Stop MTCH field associated with the repeated LCID in the MSI. In such an aspect, the reserved value indicates the expected time of the upcoming suspension, the expected time being based on a multiple of an MSP, and the expected time is later than the time it takes to establish the unicast bearer.

In such an aspect, the first notification in the MSI includes the LCID associated with the corresponding MTCH and a suspension indicator associated with the LCID that is associated with the corresponding MTCH, and the LCID of the set of LCIDs is associated with a TMGI that identifies the service of the MBMS session for the upcoming suspension. In such an aspect, the suspension indicator indicates an expected time of the upcoming suspension, the expected time being based on a multiple of an MSP, and the expected time is later than time it takes to establish the unicast bearer.

In such an aspect, where the MSI is associated with a second MSP that is subsequent to a first MSP, the reception component 1604 and an MBMS suspension management component 1610 receive during the first MSP the MSI associated with the second MSP as the first notification, and the MSI associated with the second MSP includes an indication for the upcoming suspension to take place in the second MSP. In such an aspect, the establishment of the unicast bearer is requested when the MSI associated with the second MSP is received during the first MSP.

In an aspect, the first notification is included in an MAC control element. In such an aspect, the MAC control element includes an LCID and a suspension indicator associated with the LCID, and the suspension indicator associated with the LCID indicates that the MBMS session associated with the LCID will be suspended.

In an aspect, the first notification is received using a DCI format 1C message. A CRC of the DCI format 1C message is scrambled with an RNTI. In such an aspect, the RNTI may be an M-RNTI. In such an aspect, the DCI format 1C message includes information of at least one MCCH to be changed and at least one session index to indicate at least one MBMS session to be suspended. In an aspect, the reception component 1604 and an MBMS suspension management component 1610 that receive the first notification receive mapping information between the at least one session index and the at least one MBMS session to be suspended via at least one of application layer signaling, a SIB13, an MCCH, or dedicated RRC signaling and configuration. In another aspect, the DCI format 1C message includes at least one of an MBSFN area identifier, a PMCH identifier, or a MTCH identifier.

The apparatus may include additional components that perform each of the blocks of the algorithm in the aforementioned flow charts of FIG. 15. As such, each block in the aforementioned flow charts of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
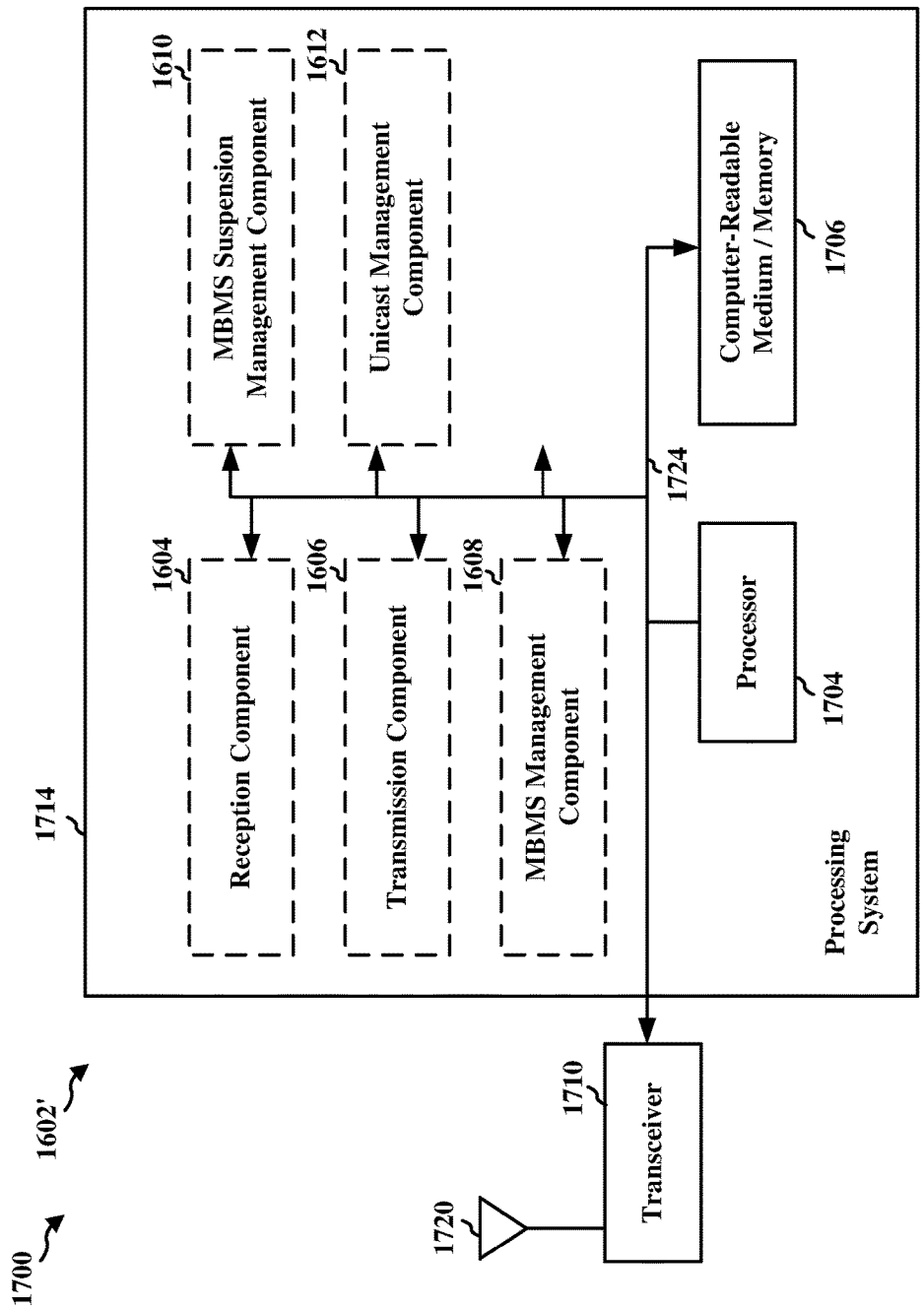
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system further includes at least one of the components 1604, 1606, 1608, 1610, and 1612. The components may be software components running in the processor 1704, resident/stored in the computer readable medium/memory 1706, one or more hardware components coupled to the processor 1704, or some combination thereof. The processing system 1714 may be a component of the UE 650 and may include the memory 660 and/or at least one of the TX processor 668, the RX processor 656, and the controller/processor 659.

In one configuration, the apparatus 1602/1602' for wireless communication includes means for receiving a service through an MBMS session, means for receiving a notification of an upcoming suspension of the MBMS session, means for requesting establishment of a unicast bearer prior to the upcoming suspension of the MBMS session upon receiving the first notification, and means for receiving a corresponding unicast version of the service of the MBMS session via unicast when the unicast bearer is established. The means for receiving the first notification may be configured to receive MSI that includes a set of LCIDs, and to determine the MBMS session to be suspended based on an LCID of the set of LCIDs, where the LCID of the set of LCIDs is associated with a corresponding MTCH that corresponds to the MBMS session to be suspended. The means for receiving the first notification may be further configured to determine that the LCID associated with the corresponding MTCH is a repeated LCID of one of the set of LCIDs, and to determine an expected time of the upcoming suspension based on a reserved value that is included in the MSI and is associated with the repeated LCID, where the establishment of the unicast bearer is requested prior to the expected time of the upcoming suspension. The means for receiving the first notification may be configured to receive mapping information between the at least one session index and the at least one MBMS session to be suspended via at least one of application layer signaling, a SIB13, an MCCH, or dedicated RRC signaling and configuration. The apparatus 1602/1602' may further include means for receiving a second notification that the MBMS session is suspended during the second MCCH modification period. The apparatus 1602/1602' may further include means for receiving a third notification about a change in MCCH information during an initial MCCH modification period prior to the first MCCH modification period during which the first notification is received.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication by a user equipment (UE), comprising:
   receiving a service through a multimedia broadcast multicast service (MBMS) session;
   receiving a first notification of an upcoming suspension of the MBMS session;
   requesting establishment of a unicast bearer prior to the upcoming suspension of the MBMS session upon receiving the first notification;
   determining the MBMS session to be suspended based on a logical channel identifier (LCID) of a set of LCID received in a multicast channel scheduling information (MSI) of the first notification, wherein the LCID of the set of LCIDs is associated with a corresponding multicast traffic channel (MTCH) that corresponds to the MBMS session to be suspended, wherein the first notification in the MSI includes the LCID associated with the corresponding MTCH and a suspension indicator associated with the LCID that is associated with the corresponding MTCH, wherein the suspension indicator indicates an expected time of the upcoming suspension, the expected time being based on one or a multiple of a multicast channel scheduling period (MSP); and
   establishing a unicast bearer; and
   receiving a corresponding unicast version of the service of the MBMS session via unicast when the unicast bearer is established.

2. The method of claim 1, wherein the first notification is received during a first multicast control channel (MCCH) modification period, the corresponding unicast version of the service is received via unicast during a second MCCH modification period, and the method further comprises receiving a second notification that the MBMS session is suspended during the second MCCH modification period.

3. The method of claim 2, further comprising:
   receiving a third notification about a change in MCCH information during an initial MCCH modification period prior to the first MCCH modification period during which the first notification is received.

4. The method of claim 2, wherein the first notification is MCCH information.

5. The method of claim 4, wherein the MCCH information is associated with a Multicast Broadcast Single Frequency Network (MBSFN) area configuration message.

6. The method of claim 1, wherein the receiving the first notification further comprises:
   determining that the LCID associated with the corresponding MTCH is a repeated LCID of one of the set of LCIDs; and
   determining an expected time of the upcoming suspension based on a reserved value that is included in the MSI and is associated with the repeated LCID,
   wherein the establishment of the unicast bearer is requested prior to the expected time of the upcoming suspension.

7. The method of claim 6, wherein the reserved value associated with the repeated LCID is included in a Stop MTCH field associated with the repeated LCID in the MSI.

8. The method of claim 6, wherein the reserved value indicates the expected time of the upcoming suspension, the expected time being based on a multiple of a multicast channel scheduling period (MSP), and
   wherein the expected time is later than time it takes to establish the unicast bearer.

9. The method of claim 1,
   wherein the LCID of the set of LCIDs is associated with a temporary mobile group identity (TMGI) that identifies the service of the MBMS session for the upcoming suspension.

10. The method of claim 9,
    wherein the expected time is later than time it takes to establish the unicast bearer.

11. The method of claim 1, wherein the first notification is included in a media access control (MAC) control element.

12. The method of claim 11, wherein the MAC control element includes a logical channel identifier (LCID) and a suspension indicator associated with the LCID, and
    wherein the suspension indicator associated with the LCID indicates that the MBMS session associated with the LCID will be suspended.

13. An apparatus for wireless communication, comprising:
    means for receiving a service through a multimedia broadcast multicast service (MBMS) session;

means for receiving a first notification of an upcoming suspension of the MBMS session;

means for requesting establishment of a unicast bearer prior to the upcoming suspension of the MBMS session upon receiving the first notification;

means for determining the MBMS session to be suspended based on a logical channel identifier (LCID) of a set of LCID received in a multicast channel scheduling information (MSI) of the first notification, wherein the LCID of the set of LCIDs is associated with a corresponding multicast traffic channel (MTCH) that corresponds to the MBMS session to be suspended, wherein the first notification in the MSI includes the LCID associated with the corresponding MTCH and a suspension indicator associated with the LCID that is associated with the corresponding MTCH, wherein the suspension indicator indicates an expected time of the upcoming suspension, the expected time being based on one or a multiple of a multicast channel scheduling period (MSP);

means for establishing a unicast bearer; and means for receiving a corresponding unicast version of the service of the MBMS session via unicast when the unicast bearer is established.

14. The apparatus of claim 13, wherein the first notification is received during a first multicast control channel (MCCH) modification period, the corresponding unicast version of the service is received via unicast during a second MCCH modification period, and the apparatus further comprises means for receiving a notification that the MBMS session is suspended during the second MCCH modification period.

15. The apparatus of claim 14, further comprising:
means for receiving a third notification about a change in MCCH information during an initial MCCH modification period prior to the first MCCH modification period during which the first notification is received.

16. The apparatus of claim 14, wherein the first notification is MCCH information.

17. The apparatus of claim 16, wherein the MCCH information is associated with a Multicast Broadcast Single Frequency Network (MBSFN) area configuration message.

18. The apparatus of claim 13, wherein the means for receiving the first notification is further configured to:
determine that the LCID associated with the corresponding MTCH is a repeated LCID of one of the set of LCIDs; and
determine an expected time of the upcoming suspension based on a reserved value that is included in the MSI and is associated with the repeated LCID,
wherein the establishment of the unicast bearer is requested prior to the expected time of the upcoming suspension.

19. The apparatus of claim 18, wherein the reserved value associated with the repeated LCID is included in a Stop MTCH field associated with the repeated LCID in the MSI.

20. The apparatus of claim 18, wherein the reserved value indicates the expected time of the upcoming suspension, the expected time being based on a multiple of a multicast channel scheduling period (MSP), and
wherein the expected time is later than time it takes to establish the unicast bearer.

21. The apparatus of claim 13,
wherein the LCID of the set of LCIDs is associated with a temporary mobile group identity (TMGI) that identifies the service of the MBMS session for the upcoming suspension.

22. The apparatus of claim 21,
wherein the expected time is later than time it takes to establish the unicast bearer.

23. The apparatus of claim 13, wherein the first notification is included in a media access control (MAC) control element.

24. The apparatus of claim 23, wherein the MAC control element includes a logical channel identifier (LCID) and a suspension indicator associated with the LCID, and
wherein the suspension indicator associated with the LCID indicates that the MBMS session associated with the LCID will be suspended.

25. An apparatus for wireless communication, comprising:
a memory; and
at least one processor coupled to the memory and configured to:
receive a service through a multimedia broadcast multicast service (MBMS) session;
receive a first notification of an upcoming suspension of the MBMS session;
request establishment of a unicast bearer prior to the upcoming suspension of the MBMS session upon receiving the first notification;
determine the MBMS session to be suspended based on a logical channel identifier (LCID) of a set of LCID received in a multicast channel scheduling information (MSI) of the first notification, wherein the LCID of the set of LCIDs is associated with a corresponding multicast traffic channel (MTCH) that corresponds to the MBMS session to be suspended, wherein the first notification in the MSI includes the LCID associated with the corresponding MTCH and a suspension indicator associated with the LCID that is associated with the corresponding MTCH, wherein the suspension indicator indicates an expected time of the upcoming suspension, the expected time being based on one or a multiple of a multicast channel scheduling period (MSP);
establish a unicast bearer; and
receive a corresponding unicast version of the service of the MBMS session via unicast when the unicast bearer is established.

26. The apparatus of claim 25, wherein the first notification is received during a first multicast control channel (MCCH) modification period, the corresponding unicast version of the service is received via unicast during a second MCCH modification period, and the at least one processor is further configured to receive a second notification that the MBMS session is suspended during the second MCCH modification period.

27. The apparatus of claim 26, wherein the at least one processor is further configured to:
receive a third notification about a change in MCCH information during an initial MCCH modification period prior to the first MCCH modification period during which the first notification is received.

28. The apparatus of claim 26, wherein the first notification is MCCH information.

29. The apparatus of claim 28, wherein the MCCH information is associated with a Multicast Broadcast Single Frequency Network (MBSFN) area configuration message.

30. The apparatus of claim 25, wherein the at least one processor configured to receive the first notification is further configured to:

determine that the LCID associated with the corresponding MTCH is a repeated LCID of one of the set of LCIDs; and determine an expected time of the upcoming suspension based on a reserved value that is included in the MSI and is associated with the repeated LCID, wherein the establishment of the unicast bearer is requested prior to the expected time of the upcoming suspension.

31. The apparatus of claim 30, wherein the reserved value associated with the repeated LCID is included in a Stop MTCH field associated with the repeated LCID in the MSI.

32. The apparatus of claim 30, wherein the reserved value indicates the expected time of the upcoming suspension, the expected time being based on a multiple of a multicast channel scheduling period (MSP), and wherein the expected time is later than time it takes to establish the unicast bearer.

33. The apparatus of claim 25, wherein the LCID of the set of LCIDs is associated with a temporary mobile group identity (TMGI) that identifies the service of the MBMS session for the upcoming suspension.

34. The apparatus of claim 33, wherein the expected time is later than time it takes to establish the unicast bearer.

35. The apparatus of claim 25, wherein the first notification is included in an media access control (MAC) control element.

36. The apparatus of claim 35, wherein the MAC control element includes a logical channel identifier (LCID) and a suspension indicator associated with the LCID, and wherein the suspension indicator associated with the LCID indicates that the MBMS session associated with the LCID will be suspended.

37. A non-transitory computer-readable medium storing computer executable code for wireless communication, comprising code for:

receiving a service through a multimedia broadcast multicast service (MBMS) session;

receiving a first notification of an upcoming suspension of the MBMS session;

requesting establishment of a unicast bearer prior to the upcoming suspension of the MBMS session upon receiving the first notification;

determining the MBMS session to be suspended based on a logical channel identifier (LCID) of a set of LCID received in a multicast channel scheduling information (MSI) of the first notification, wherein the LCID of the set of LCIDs is associated with a corresponding multicast traffic channel (MTCH) that corresponds to the MBMS session to be suspended, wherein the first notification in the MSI includes the LCID associated with the corresponding MTCH and a suspension indicator associated with the LCID that is associated with the corresponding MTCH, wherein the suspension indicator indicates an expected time of the upcoming suspension, the expected time being based on one or a multiple of a multicast channel scheduling period (MSP);

establishing a unicast bearer; and receiving a corresponding unicast version of the service of the MBMS session via unicast when the unicast bearer is established.

* * * * *